(12) United States Patent
Mirajkar et al.

(10) Patent No.: US 12,216,945 B1
(45) Date of Patent: Feb. 4, 2025

(54) DIRECT-ATTACHED STORAGE DEVICE SOFTWARE RAID HIBERNATION SYSTEM

(71) Applicant: Dell Products L.P., Round Rock, TX (US)

(72) Inventors: Abhijit Shashikant Mirajkar, Bangalore (IN); Abhijit Rajkumar Khande, Bangalore (IN); Nikhith Ganigarakoppal Kantharaju, Hassan (IN); Ajay Sukumaran Nair Syamala Bai, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/228,015

(22) Filed: Jul. 31, 2023

(51) Int. Cl.
   *G06F 3/06* (2006.01)
(52) U.S. Cl.
   CPC .......... *G06F 3/0689* (2013.01); *G06F 3/0625* (2013.01); *G06F 3/0632* (2013.01)
(58) Field of Classification Search
   CPC ..... G06F 3/0689; G06F 3/0625; G06F 3/0632
   See application file for complete search history.

(56) References Cited

U.S. PATENT DOCUMENTS

2007/0079067 A1\* 4/2007 Ranganathan ...... G06F 11/2082
                                                      711/114
2015/0058521 A1    2/2015 Armstrong et al.

\* cited by examiner

*Primary Examiner* — Jae U Yu
(74) *Attorney, Agent, or Firm* — Joseph Mencher

(57) ABSTRACT

A direct-attached storage device software RAID hibernation system includes a chassis having an operating system, a bus driver subsystem, controller devices coupled to physical storage devices, and a software RAID subsystem coupled to the operating system and the controller devices. While in a runtime mode, the software RAID subsystem presents the operating system a primary controller device as being connected to a logical storage device provided by the physical storage devices, and provides a filter subsystem in a secondary controller device that controls at least one of the physical storage devices. While in the runtime mode, the filter subsystem identifies a controller initialization request from the operating system that requests initialization of the secondary controller device and, in response, transmits a power-down prevention communication to the bus driver subsystem that is configured to prevent the bus driver subsystem from powering down the secondary controller device during a hibernation mode.

20 Claims, 28 Drawing Sheets

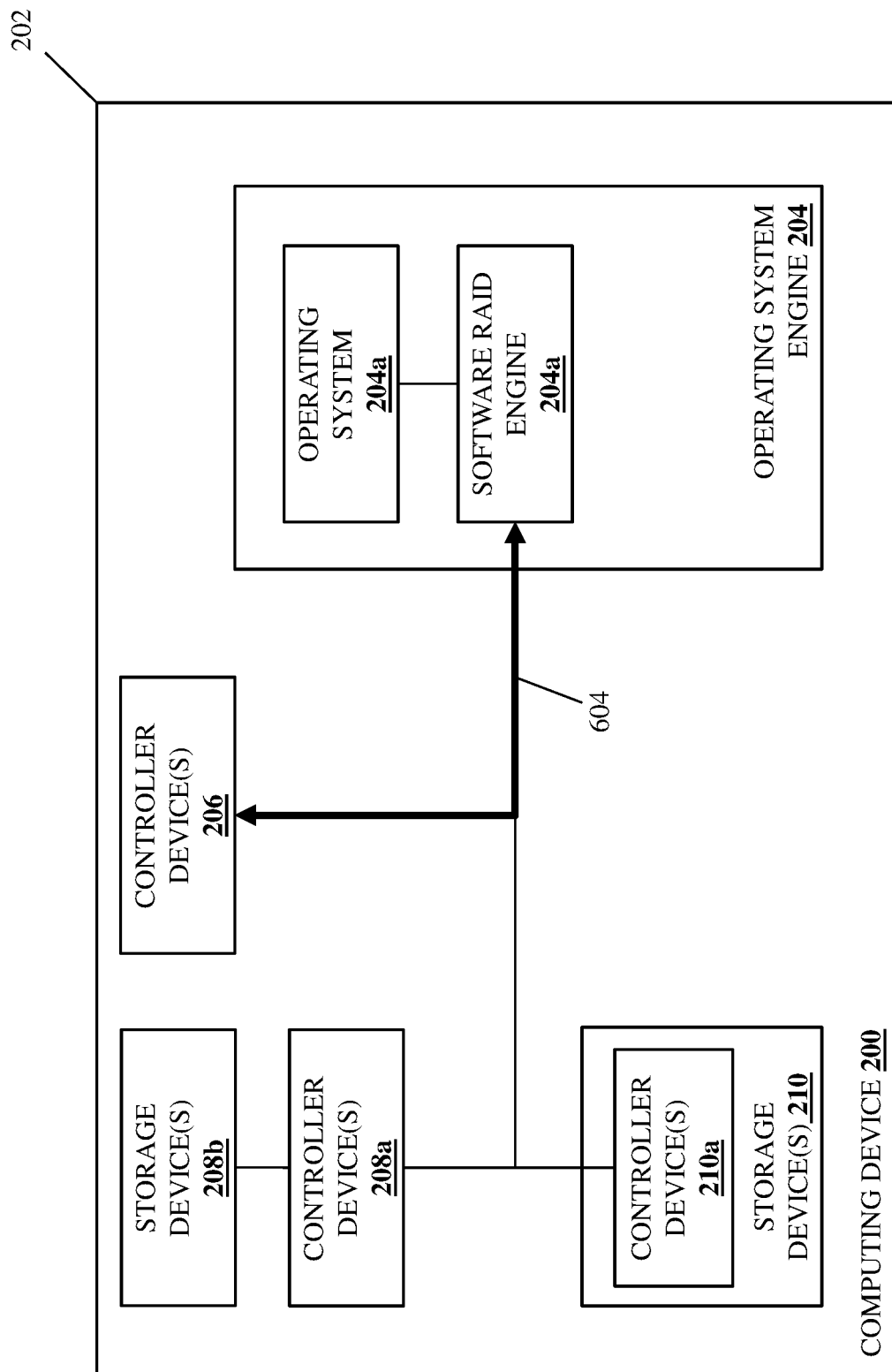

DIRECT-ATTACHED STORAGE DEVICE SOFTWARE RAID HIBERNATION SYSTEM

CROSS-REFERENCE TO RELATED APPLICATIONS

The present application is related to the following co-pending applications: (1) U.S. patent application Ser. No. 18/228,006, filed Jul. 31, 2023; (2) U.S. patent application Ser. No. 18/228,028, filed Jul. 31, 2023; (3) U.S. patent application Ser. No. 18/228,055, filed Jul. 31, 2023; and (4) U.S. patent application Ser. No. 18/229,293, filed Aug. 2, 2023.

BACKGROUND

The present disclosure relates generally to information handling systems, and more particularly to providing for hibernation in a software Redundant Array of Independent Disk (RAID) that uses direct-attached storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, operating systems in server devices and/or other computing devices known in the art use connected storage devices to store their data, and the protection of such data in the event of the unavailability of any of those storage devices is desirable. An option for protecting data stored on storage devices like those described above includes the utilization of Redundant Array of Independent Disk (RAID) techniques, which one of skill in the art in possession of the present disclosure will recognize is a data storage virtualization technology that combines multiple physical storage devices into one or more logical storage devices for the purposes of data redundancy, performance improvements, and/or other RAID benefits that would be apparent to one of skill in the art in possession of the present disclosure. However, the utilization of RAID techniques on data stored by an operating system in a server device can raise some issues.

For example, the WINDOWS® operating system available from MICROSOFT® Corp. of Redmond, Washington, United States, utilizes a "storage spaces" data protection solution that may be configured to protect data from storage device unavailability discussed above by aggregating storage devices connected to a server/host device via the RAID techniques discussed above, and creating a logical storage device. However, such "storage spaces" data protection solutions do not provide the ability to configure the logical storage device during pre-boot or other initialization operations for the server device, which prevents the installation of the WINDOWS® operating system on that logical storage device. One solution to such issues is the provisioning of a hardware-based RAID data protection solution in the server device that implements hardware-based RAID data protection techniques on data stored in the storage devices in the server device, but such hardware-based RAID data protection solutions are relatively expensive.

Another solution to such issues is the use of a software RAID data protection solution in the server device like that provided in the Virtual RAID on Central Processing Unit (CPU) (VROC) data protection solution available in CPUs provided by INTEL® corporation of Santa Clara, California, United States. However, the VROC data protection solution discussed above is relatively limited in that it is only provided with INTEL® CPUs, may only be utilized with Non-Volatile Memory express (NVMe) storage devices and Serial AT Attachment (SATA) storage devices, only provides RAID1 and RAID5 data protection, and requires Volume Management Device (VMD) hardware in the CPU. As such, the VROC data protection solutions discussed above do not operate with some types of storage devices (e.g., Serial Attached Small Computer System Interface (SCSI) (SAS) storage devices) or some types of CPUs (e.g., CPUs available from Advance Micro Devices (AMD) of Santa Clara, California, United States). Furthermore, the VROC data protection solutions discussed above are also associated with relatively high licensing costs.

Accordingly, it would be desirable to provide a direct-attached storage device software RAID system that addresses the issues discussed above.

SUMMARY

According to one embodiment, an Information Handling System (IHS) includes a storage controller processing system; and a storage controller memory system that is coupled to the storage controller processing system and that includes instructions that, when executed by the storage controller processing system, cause the storage controller processing system to provide a filter engine that is configured to: identify, while in a runtime mode, a controller initialization request from an operating system that requests initialization of a storage controller device that includes the storage controller processing system and the storage controller memory system and that controls at least one of a plurality of physical storage devices that provide a logical storage device; and transmit, to a bus driver subsystem while in the runtime mode and in response to identifying the initialization request, a power-down prevention communication that is configured to prevent the bus driver subsystem from powering down the storage controller device during a hibernation mode.

BRIEF DESCRIPTION OF THE DRAWINGS

FIG. 6C is a schematic view illustrating an embodiment of the operation of the computing device of FIG. 2 during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
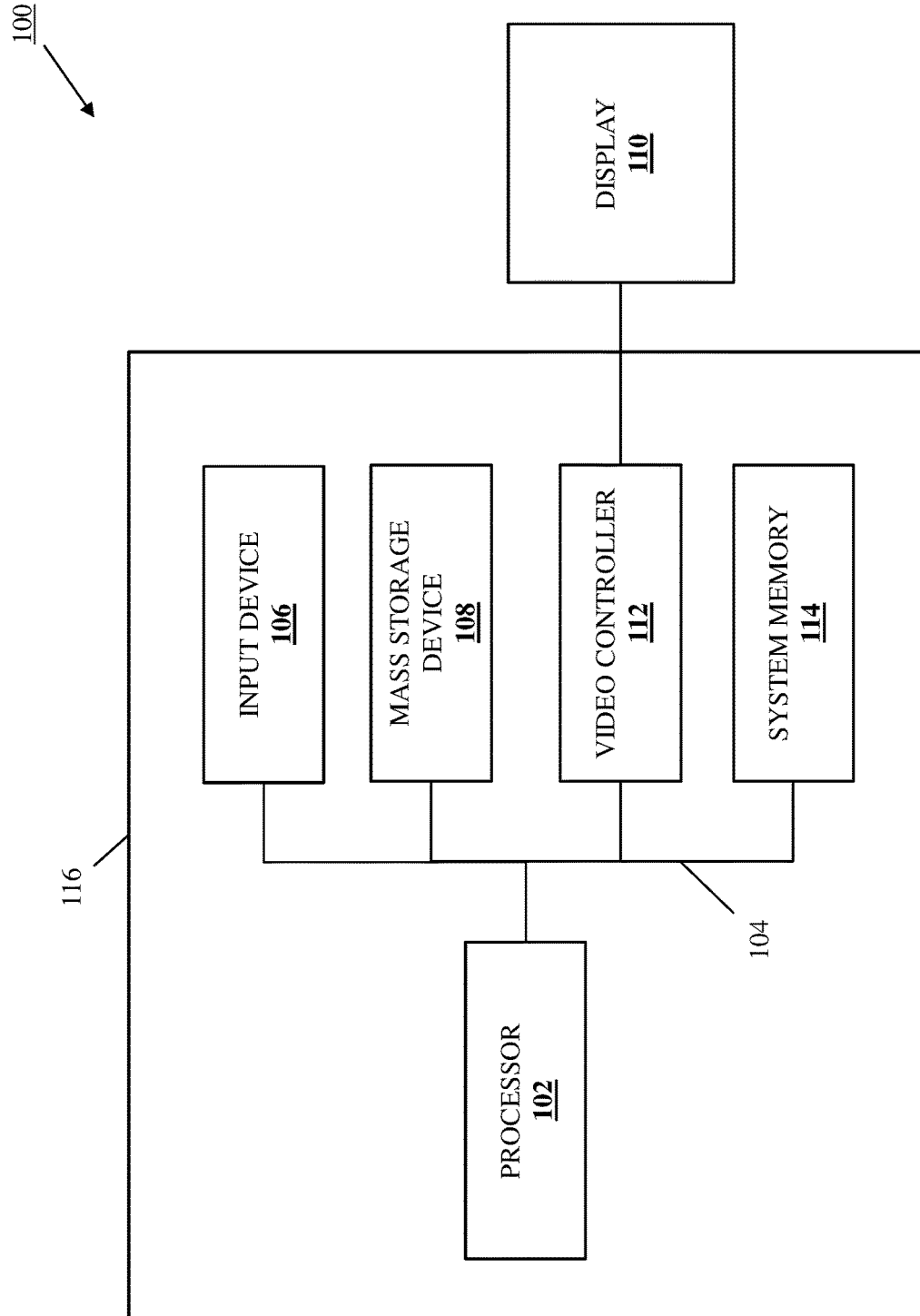
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
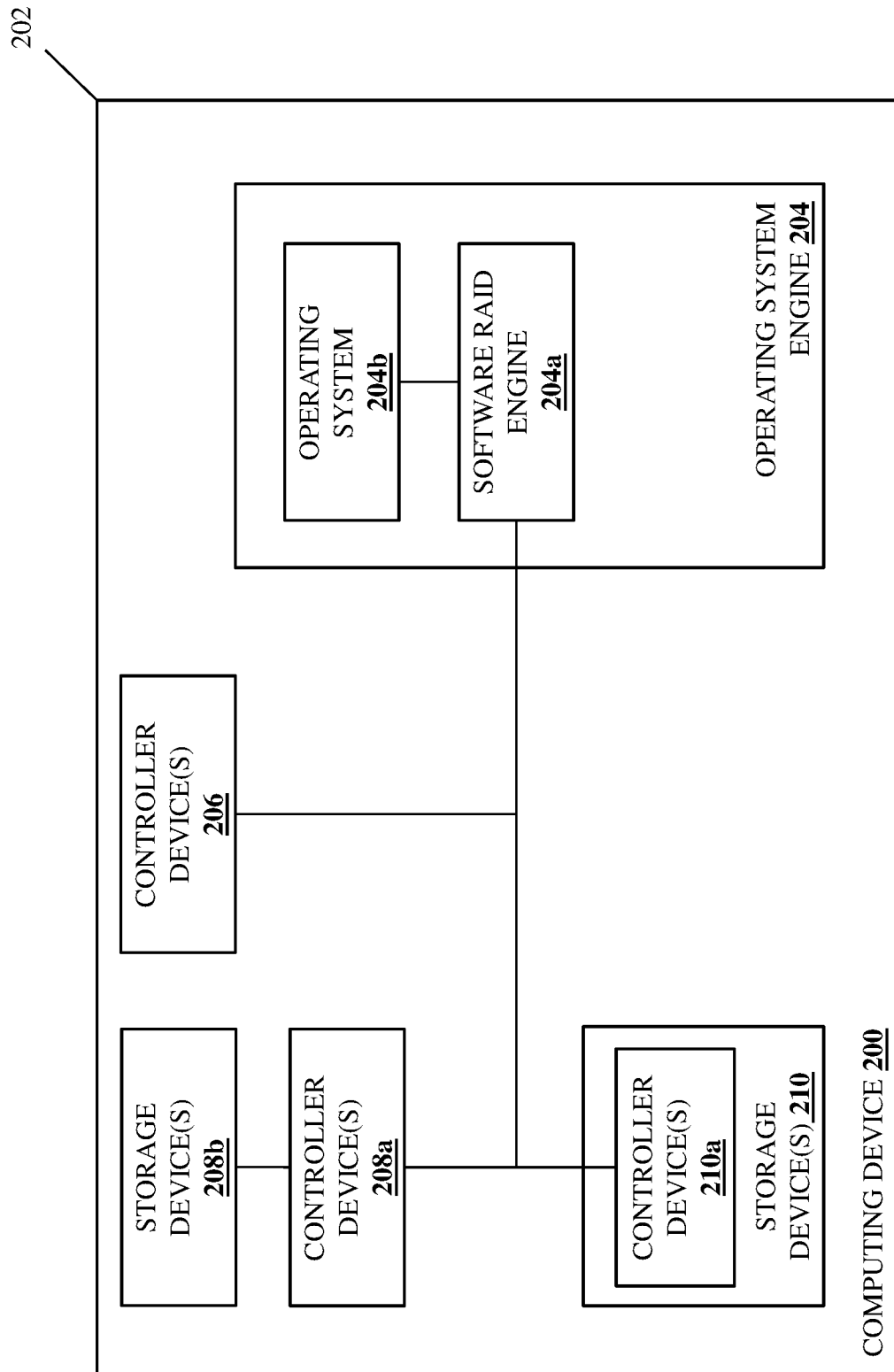
FIG. 2 is a schematic view illustrating an embodiment of a computing device that may include the direct-attached storage device software RAID system of the present disclosure.

Referring now to FIG. 2, an embodiment of a computing device 200 is illustrated that may include the direct-attached storage device software RAID system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a processing system (not illustrated, but which may include the processor 102 discussed above with reference to FIG. 1 such as a Central Processing Unit (CPU)) and a memory system (not illustrated, but which may include the memory 114 discussed above with reference to FIG. 1 such as Dynamic Random Access Memory (DRAM)) that is coupled to the processing system and that includes instructions that, when executed by the processing system, cause the processing system to provide an operating system engine 204 that is configured to perform the functionality of the operating system engines and/or computing devices discussed below. In the illustrated embodiment, the memory system may also include instructions that, when executed by the processing system, cause the processing system to provide a software RAID engine 204a that is configured to perform the functionality of the software RAID engines, software RAID subsystems, and/or computing devices discussed below.

To provide a specific example, the software RAID engine 204a may include a software RAID driver that is configured to utilize hardware resources in the computing device (e.g., the CPU, memory, etc.) in order to create and manage RAID infrastructure and/or perform any of a variety of RAID operations known in the art without the need for dedicated/specialized RAID hardware (e.g., a dedicated hardware RAID controller). However, while the software RAID engine 204a is illustrated and described as being included in the operating system and/or otherwise being provided by the operating system engine 204 (i.e., being provided by the processing/memory system combination that also provides the operating system engine 204), one of skill in the art in possession of the present disclosure will appreciate how the software RAID engine 204a may be provided separately from the operating system/operating system engine 204 while remaining within the scope of the present disclosure as well.

In an embodiment, the software RAID driver in the software RAID engine 204a will include a Small Computer System Interface (SCSI)-based driver, and one of skill in the art in possession of the present disclosure will appreciate how such a SCSI-compliant driver may be configured to be utilized with any PCIe devices/PCIe controller devices (e.g., Advanced Host Controller Interface (AHCI) controllers, SAS controllers, virtual PCIe controllers, NVMe controllers, etc.), thus allowing a computing device manufacturer to provide a single SCSI-based software RAID driver on a plurality of different computing device configurations of computing devices manufactured by the computing device manufacturer in order to enable the software RAID functionality described below in any of those computing devices using the PCIe devices/PCIe controller devices included in those computing devices. To provide a specific example, the software RAID driver in the software RAID engine 204a may be implemented via the Storport/miniport model used in the WINDOWS® operating system, although other software RAID driver configurations will fall within the scope of the present disclosure as well.

In the illustrated embodiment, the memory system may also include instructions that, when executed by the processing system, cause the processing system to provide an operating system 204b that is configured to use and control the hardware resources in the computing device 200, and/or perform any of the other functionality of the operating systems and/or computing devices discussed below. For example, the operating system 204b may be provided by a WINDOWS® operating system available from MICROSOFT® Corp. of Redmond, Washington, United States, although other operating systems are envisioned as falling within the scope of the present disclosure as well.

In the illustrated embodiment, the chassis 202 also houses one or more controller devices 206 that are coupled to the software RAID engine 204a (e.g., via a coupling between the controller device(s) 206 and the processing system that provides the software RAID engine 204a). As discussed in the specific examples provided below, the controller device(s) 206 may be provided by Peripheral Component Interconnect express (PCIe) controller devices that may be included in and/or coupled to PCIe devices that are not provided by storage devices. For example, the PCIe controller device(s) 206 may be physical or virtual PCIe controller devices and may be included in Host Bus Adapter (HBA) devices, Advanced Host Controller Interface (AHCI) devices, and/or other PCIe devices that would be apparent to one of skill in the art in possession of the present disclosure. However, while illustrated and described as being provided by PCIe controller device(s), one of skill in the art in possession of the present disclosure will appreciate how the controller device(s) 206 may be provided by other types of controller devices while remaining within the scope of the present disclosure as well.

In the illustrated embodiment, the chassis 202 also houses one or more controller devices 208a that are coupled to the software RAID engine 204a (e.g., via a coupling between the controller device(s) 208a and the processing system that provides the software RAID engine 204a). As illustrated and discussed in the specific examples provided below, the controller device(s) 208a may be provided by Peripheral Component Interconnect express (PCIe) storage controller devices that are coupled to one or more storage devices 208b that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 208a may be provided by physical or virtual PCIe storage controller devices and may include PCIe storage controller devices configured as NVMe storage controllers, SAS storage controllers, SATA storage controllers, and/or other PCIe storage controller devices that would be apparent to one of skill in the art in possession of the present disclosure. However, while illustrated and described as being provided by PCIe controller device(s), one of skill in the art in possession of the present disclosure will appreciate how the controller device(s) 208a may be provided by other types of controller devices while remaining within the scope of the present disclosure as well.

In the illustrated embodiment, the chassis 202 also houses one or more controller devices 210a that are coupled to the software RAID engine 204a (e.g., via a coupling between the controller device(s) 208a and the processing system that provides the software RAID engine 204a). As illustrated and discussed in the specific examples provided below, the controller device(s) 210a may be provided by Peripheral Component Interconnect express (PCIe) controller devices that are included in one or more storage devices 210 that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 210a may be provided by physical or virtual PCIe storage controller devices and may include PCIe storage controller devices configured as NVMe storage controllers. However, while illustrated and described as being provided by PCIe controller device(s), one of skill in the art in possession of the present disclosure will appreciate how the controller device(s) 210a may be provided by other types of controller devices while remaining within the scope of the present disclosure as well.

However, while three different embodiments of controller devices 206, 208a, and 210a are illustrated and described as being included in the computing device 200 (e.g., stand-alone controller device(s), storage-device-connected controller device(s), and storage-device-integrated controller device(s)), one of skill in the art in possession of the present disclosure will appreciate how one or more of the controller devices 206, 208a, and/or 210a may be omitted from the computing device 200 while remaining within the scope of the present disclosure as well. Furthermore, while not explicitly illustrated, one of skill in the art in possession of the present disclosure will appreciate how any of the controller devices 208a and/or 210a may be coupled to and/or may control multiple storage devices 208b and/or 210, respectively, while remaining within the scope of the present disclosure as well.

Further still, one of skill in the art in possession of the present disclosure will appreciate how storage devices may be coupled to the software RAID engine 204a via multiple controller devices (e.g., when an NVMe storage device with an integrated controller device is connected via an external controller device to the software RAID engine 204a). As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the direct-attached storage device software RAID functionality discussed below, while remaining within the scope of the present disclosure as well.

For example, one of skill in the art in possession of the present disclosure will appreciate how the present disclosure describes the direct-attached storage device software RAID system of the present disclosure implemented to operate with an operating system such as the WINDOWS® operating system described above. However, at least some of the inventors of the present disclosure have also developed a direct-attached storage device software RAID system may be implemented with a hypervisor subsystem in order to allow software RAIDs to be provided using any types of direct-attached storage devices and any types of CPUs in a computing device similarly as described below, and that direct-attached storage device software RAID system is described in U.S. patent application Ser. No. 18/227,914, filed Jul. 29, 2023, the disclosure of which is incorporated herein by reference in its entirety.

Figure 3:
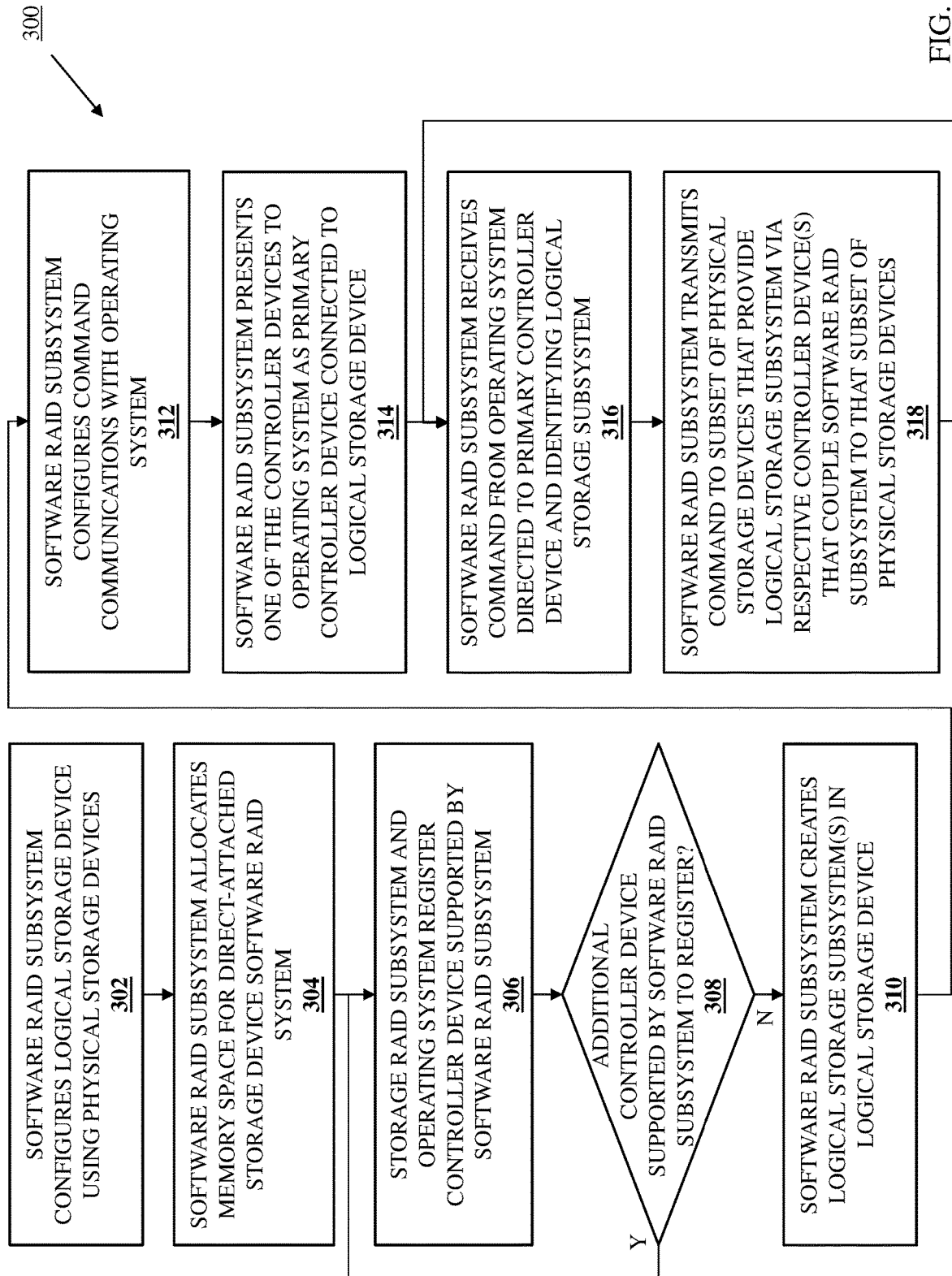
FIG. 3 is a flow chart illustrating an embodiment of a method for providing a software RAID using direct-attached storage devices in a computing device.

Referring now to FIG. 3, an embodiment of a method 300 for providing a software Redundant Array of Independent Disk (RAID) using direct-attached storage devices in a computing device is illustrated. As discussed below, the systems and methods of the present disclosure provide for the presentation by a software RAID subsystem to an operating system of a single, primary controller device as being connected to a logical storage device provided by a plurality of physical storage devices, with the software RAID subsystem receiving commands from the operating system that are directed to the primary controller device and that identify a logical storage subsystem that is included in the logical storage device, and transmitting those commands to a subset of the physical storage devices that provide that logical storage subsystem via respective controller device(s) that couple the software RAID subsystem to that subset of physical storage devices.

For example, the direct-attached storage device software RAID system of the present disclosure may include a chassis housing a software RAID subsystem coupled to physical storage devices, controller devices, and an operating system housed in the chassis. The software RAID subsystem uses the physical storage devices to provide a logical storage device to the operating system. The software RAID subsystem also presents a first controller device to the operating system as a primary controller device that is connected to the logical storage device. When the software RAID subsystem receives a command from the operating system directed to the primary controller device and identifying a logical storage subsystem in the logical storage device, it transmits the command to each of a subset of the physical storage devices that provide the logical storage subsystem in the logical storage device via a respective one of the controller devices that couples the software RAID subsystem to that physical storage device. As such, software RAIDs may be provided using any types of direct-attached storage devices and any types of CPUs in a computing device, as well as provide a variety of other benefits that would be apparent to one of skill in the art in possession of the present disclosure.

Figure 4:
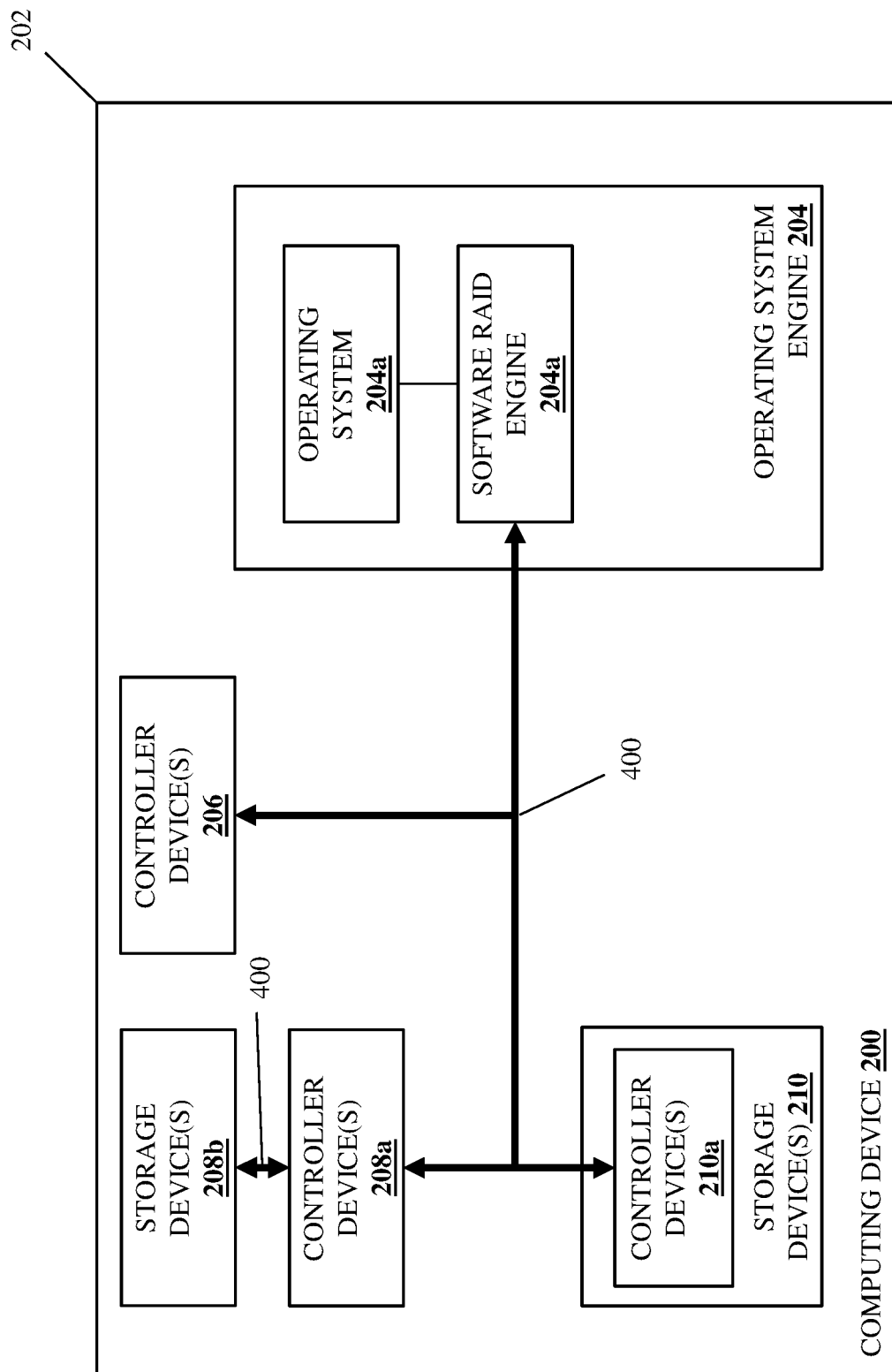
FIG. 4 is a schematic view illustrating an embodiment of the operation of the computing device of FIG. 2 during the method of FIG. 3.

The method 300 begins at block 302 where a software RAID subsystem configures a logical storage device using physical storage devices. With reference to FIG. 4, in an embodiment of block 302, the software RAID engine 204a in the computing device 200 may perform logical storage device configuration operations 400 that may include discovering each of the controller devices 206, 208a, and 210a and, in response, discovering each of the storage devices 208b and/or 210 coupled thereto, and then configuring a logical storage device using those storage devices 208b and/or 210. In a specific example, each of the storage device(s) 208a may be coupled to a PCIe controller device that is provided by one of the controller device(s) 208a discovered at block 302, and each of the storage device(s) 210 may include a PCIe controller device that is provided by one of the controller device(s) 210a discovered at block 302, while PCIe controller device(s) that are provided by the controller device(s) 206 and that are not coupled to storage devices may be discovered at block 302 as well.

For example, in response to the powering on, reset, reboot, and/or other initialization of the computing device 200, the computing device 200 may enter a pre-boot mode in which the software RAID engine 204a performs any of a variety of software RAID operations and/or other techniques that would be apparent to one of skill in the art in possession of the present disclosure in order to configure a RAID using the storage devices 208a and 210 that allows the software RAID engine 204a to present those storage devices 208a and 210 as one or more logical storage devices. As will be appreciated by one of skill in the art in possession of the present disclosure, the RAID maybe configured using the storage devices 208a and 210 with a variety of standard RAID levels such as a RAID0, RAID1, RAID2, RAID3, RAID4, RAID5, or RAID 6, as well as combinations of standard RAID levels (e.g., RAID 1+0, also known as RAID10), non-standard RAID levels, and/or any other RAID levels that would be apparent to one of skill in the art in possession of the present disclosure.

The method 300 then proceeds to block 304 where the software RAID subsystem allocates memory space for a direct-attached storage device software RAID system. In an embodiment, at block 304, the software RAID engine 204a in the computing device 200 may perform memory space allocation operations that may include allocating memory space for use by the direct-attached storage device software RAID system of the present disclosure. For example, the memory space allocation operations performed by the software RAID engine 204a may include allocating a memory space or other portion of the memory system that is used to provide the operating system engine 204 (e.g., operating system kernel memory) for use by the software RAID engine 204a to perform any of the direct-attached storage device software RAID operations or other functionality discussed below. As will be appreciated by one of skill in the art in possession of the present disclosure, the memory space or other portion of the memory system allocated for use by the direct-attached storage device software RAID system may be referred to a "non-cached/non-coherent memory" that may be dynamically allocated during initialization of the computing device 200 to the software RAID driver provided by the software RAID engine 204a (e.g., unlike memory space allocated to stacks), and one of skill in the art in possession of the present disclosure will recognize how the non-cached/non-coherent memory may be utilized to perform any of the functionality described below.

In a specific example, the allocation of the non-cached/non-coherent memory to the software RAID engine 204a may be performed during module initialization operations that are performed when the operating system 204b provided by the operating system engine 204 is loaded and calls those module initialization operations, and the software RAID engine 204a may allocate the non-cached/non-coherent memory based on a number of storage devices (e.g., a maximum number of storage devices) that the software RAID engine 204a is configured to support. However, while a specific example of the allocation of memory space for use by the direct-attached storage device software RAID system of the present disclosure has been described, one of skill in the art in possession of the present disclosure will appreciate how memory space may be allocated for use by the direct-attached storage device software RAID system using a variety of techniques that will fall within the scope of the present disclosure as well.

Figure 5:
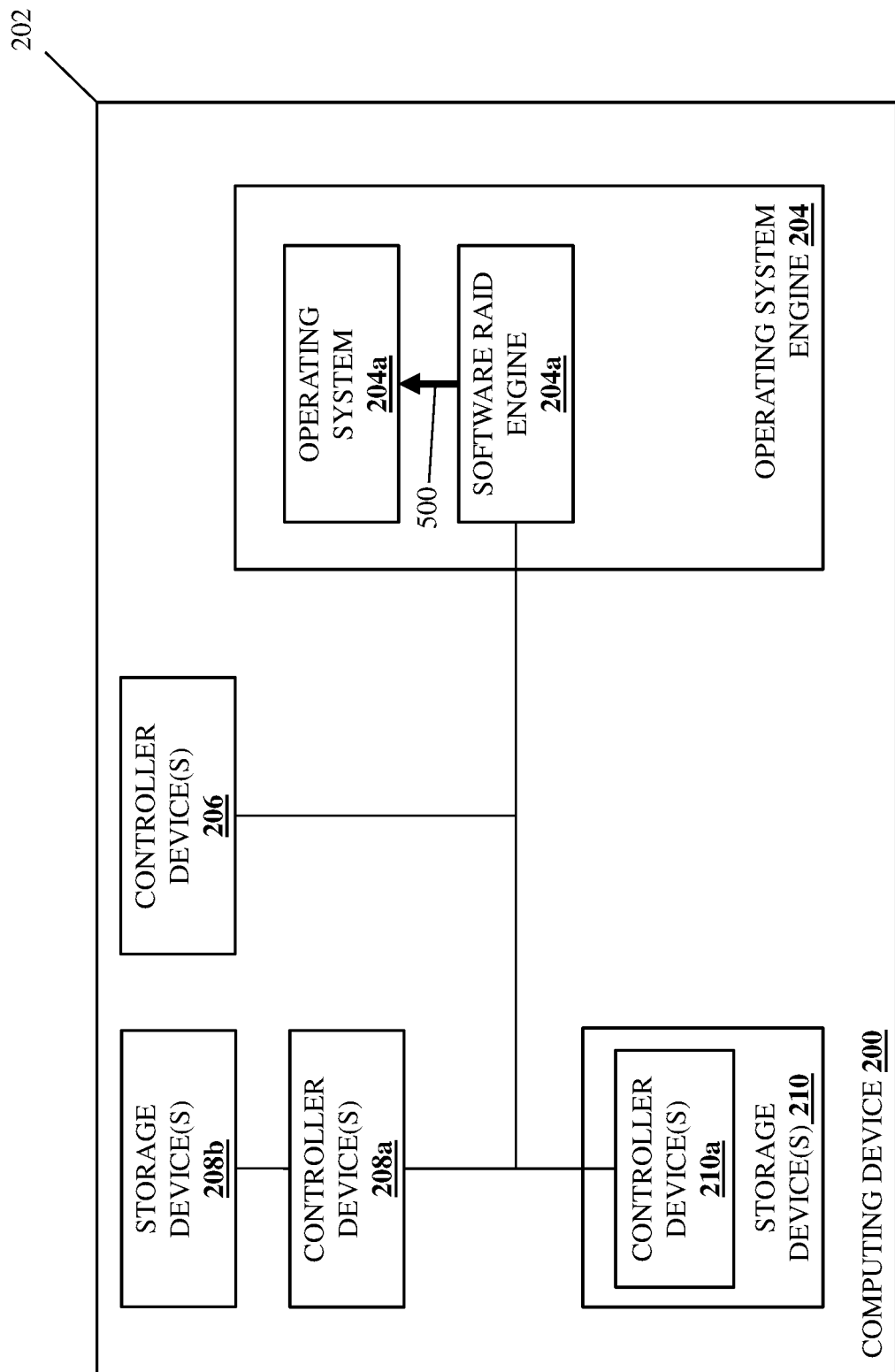
FIG. 5 is a schematic view illustrating an embodiment of the operation of the computing device of FIG. 2 during the method of FIG. 3.

The method 300 then proceeds to block 306 where the software RAID subsystem and the operating system register a controller device supported by the software RAID subsystem. With reference to FIG. 5, in an embodiment of block 306, the controller device registration operations may include the software RAID engine 204a in the computing device 200 performing supported controller device identification operations 500 that may include identifying controller devices that are supported by the software RAID engine 204a to the operating system 204b in the computing device 200 (e.g., using miniport driver commands). For example, any of the controller devices 206, 208a, and/or 210a discovered at block 302 as discussed above may be identified to the operating system 204b as supported controller devices at block 306. In a specific example, at block 306, the software RAID engine 204a may generate a Peripheral Component Interconnect (PCI) IDentification (PCIID) file that identifies the PCIe controller devices that are supported by the software RAID engine 204a, and may load or otherwise transmit that PCIID file to the operating system 204b. However, while a specific example of the identification of controller devices to the operating system 204b that are supported by the software RAID engine 204a has been described, one of skill in the art in possession of the present disclosure will appreciate how the software RAID engine 204a may identify supported controller devices to the operating system 204b using other techniques that will fall within the scope of the present disclosure as well.

Figure 6A:
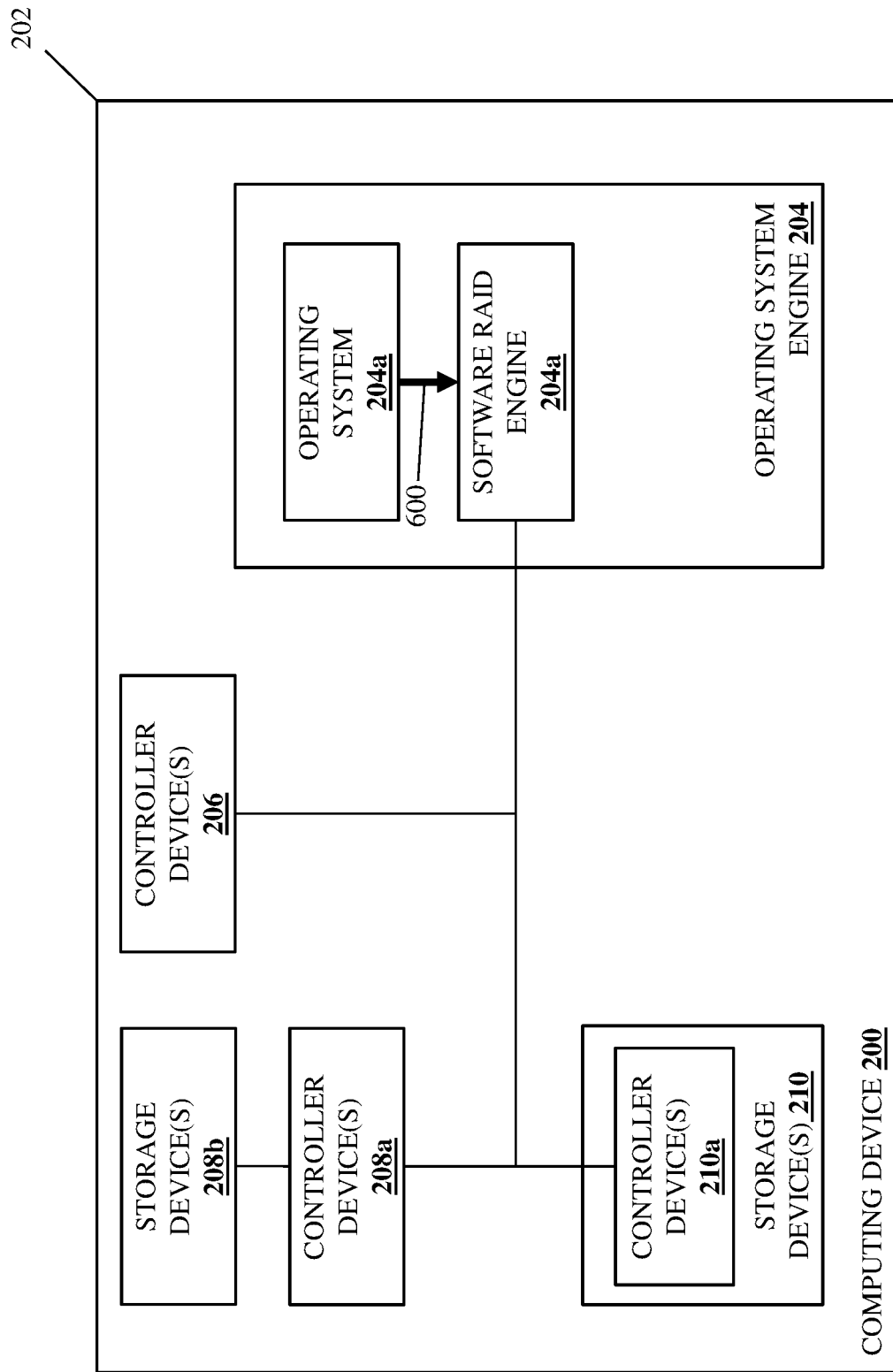
FIG. 6A is a schematic view illustrating an embodiment of the operation of the computing device of FIG. 2 during the method of FIG. 3.

With reference to FIG. 6A, in an embodiment of block 306, the controller device registration operations may also include the operating system 204b in the computing device 200 performing controller device attachment request operations 600 that may include the operating system 204b generating and transmitting a controller device attachment request for one of the controller devices that was identified as being supported by the software RAID engine 204a. For example, the operating system 204b may generate and transmit a "Find Adapter" call that provides the controller device attachment request and that one of skill in the art in possession of the present disclosure will recognize provides an instruction to the software RAID engine to find and attach one of the controller devices that was identified as being supported (e.g., via a Storport layer). However, while a specific example of a controller device attachment request has been described, one of skill in the art in possession of the present disclosure will appreciate how the operating system 204b may request the initialization and discovery of controller devices using other techniques that will fall within the scope of the present disclosure as well.

Figure 6B:
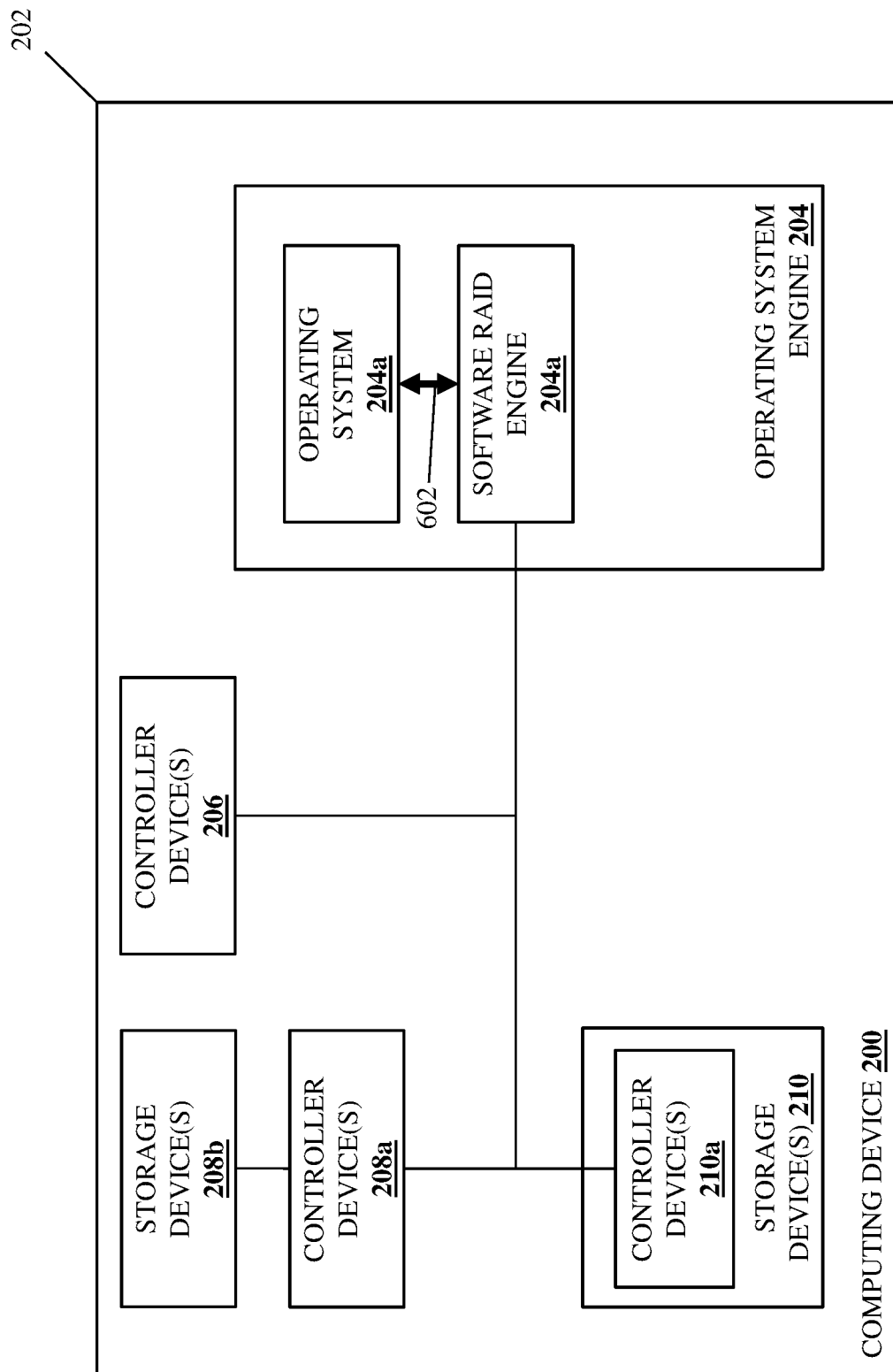
FIG. 6B is a schematic view illustrating an embodiment of the operation of the computing device of FIG. 2 during the method of FIG. 3.

With reference to FIG. 6B, in an embodiment of block 306 and in response to receiving the controller device attachment request (e.g., the "FindAdapter" call), the controller device registration operations may also include the software RAID engine 204a and the operating system 204b in the computing device 200 performing controller device attachment operations 602 that may include the software RAID engine 204a processing the controller device attachment request, attaching a corresponding controller device, and confirming the completion of the controller device attachment request that was received from the operating system 204b. For example, in response to the successful attachment of a connected controller device and its corresponding storage device(s), the software RAID engine 204a may confirm the attachment request to the operating system 204b (e.g., via a "Find Adapter call success" communication transmitted to the operating system 204b). While not illustrated or discussed in detail, one of skill in the art in possession of the present disclosure will appreciate how the software RAID engine 204a may identify to the operating system 204b any failures of the attachment of any connected controller devices and its corresponding storage device(s) as well. In response to receiving the confirmation of the controller device attachment request (e.g., the "Find Adapter call success" communication), the controller device attachment operations 602 may include the operating system 204b generating and transmitting an initialization and discovery request (e.g., a "HwInitialize" call) to the software RAID engine 204a.

With reference to FIG. 6C, in an embodiment of block 306 and in response to receiving the initialization and discovery request from the operating system 204b, the controller device registration operations may also include the software RAID engine 204a in the computing device 200 performing initialization and discovery operations 604 that may include, in the specific example provided in FIG. 6C, the software RAID engine 204a initializing and discovering the one of the controller device(s) 206 identified by the operating system 204b in the controller device attachment request. As will be appreciated by one of skill in the art in possession of the present disclosure, the initialization and discovery operations 604 performed by the software RAID engine 204a may include any of a variety of initialization operations and discovery operations that would be apparent to one of skill in the art in possession of the present disclosure, that may depend on the protocol supported by that controller device (e.g., a SAS protocol, a SATA protocol, an NVMe protocol, etc.), and that result in the registration of that controller device 206 with the operating system 204b.

In some embodiments, following the initialization and discovery of the first controller device during the first iteration of block 306, the software RAID engine 204a in the computing device 200 may perform timer registration operations that may include registering a timer with the operating system 204b. As discussed below, some embodiments of the present disclosure may include the utilization of a timer to determine when the last controller device has been registered as part of the controller device registration operations performed across one or more iterations of block 306 of the method 300, and thus that timer may be registered by the software RAID engine 204a with the operating system 204b at block 306 using any of a variety of timer registration techniques that would be apparent to one of skill in the art in possession of the present disclosure. However, the registration of the timer is described as occurring at a particular point in method 300 (e.g., following initialization and discovery of the first controller device during the first iteration of block 306), one of skill in the art in possession of the present disclosure will appreciate how the timer may be registered at other points in the method 300 while remaining within the scope of the present disclosure as well. Furthermore, and as discussed in further details below, other embodiments of the method 300 may utilize other techniques to determine when the last controller device has been registered as part of the controller device registration operations across one or more iterations of block 306 of the method 300, and thus the timer registration operations may be skipped in those embodiments.

The method 300 then proceeds to decision block 308 where it is determined whether there is an additional controller device supported by the software RAID subsystem to register. In some embodiments of decision block 308, following the registration of the one of the controller device(s) 206 (in the specific example provided in FIG. 6B) in the operating system 204b at block 306, the software RAID engine 204a in the computing device 200 may perform timer activation operations in order to activate the timer discussed above that may have been registered with the operating system 204b in some embodiments of the present disclosure. The software RAID engine 204a may then monitor that timer at decision block 308 to determine whether another controller device attachment request (e.g., the "FindAdapter" call in the specific example provided above) for another of the controller devices 206, 208b, and/or 210a is received from the operating system 204b within a threshold time period. As will be appreciated by one of skill in the art in possession of the present disclosure, the software RAID engine 204a may utilize any of a variety of threshold time periods that, after which, the software RAID engine 204a may assume that no further controller device attachment requests will be received (i.e., that there are no further controller devices to be registered with the operating system 204b).

However, while the use of a timer and threshold time period following registration of any particular controller device in order to determine whether there are any other controller devices to register at decision block 308 has been described, as discussed above other techniques for determining whether there are any other controller devices to register at decision block 308 will fall within the scope of the present disclosure as well. For example, other embodiments of the present disclosure may provide a software driver in the computing device 200 that is configured to identify a number of available controller devices in the computing device 200, and then transmit that number of available controller devices to the software RAID engine 204a for use in determining at decision block 308 whether the number of controller devices registered with the operating system 204a has reached that number of available controller devices. As such, the determination of whether there are any other controller devices to register in the operating system 204b during decision block 308 of the method 300 may be performed in a variety of manners while remaining within the scope of the present disclosure.

If, at decision block 308, it is determined that there is an additional controller device supported by the software RAID subsystem to register, the method 300 returns to block 306. As such, the method 300 may loop such that the software RAID engine 204a and the operating system 204b in the computing device 200 operate to register any additional controller device with the operating system 204b. Thus, different iterations of block 306 and decision block 308 may cause the software RAID engine 204a and the operating system 204b to register each of the controller devices in the computing device 200 in the operating system 204b. For example, for any remaining controller devices 206, 208a, and 210a, the controller device attachment request operations 600, controller device attachment operations 602, and initialization and discovery operations 604 described above for block 306 may be performed for that controller device, and block 306 may repeat until it is determined that there are no additional controller devices to register with the operating system 204b.

Figure 7:
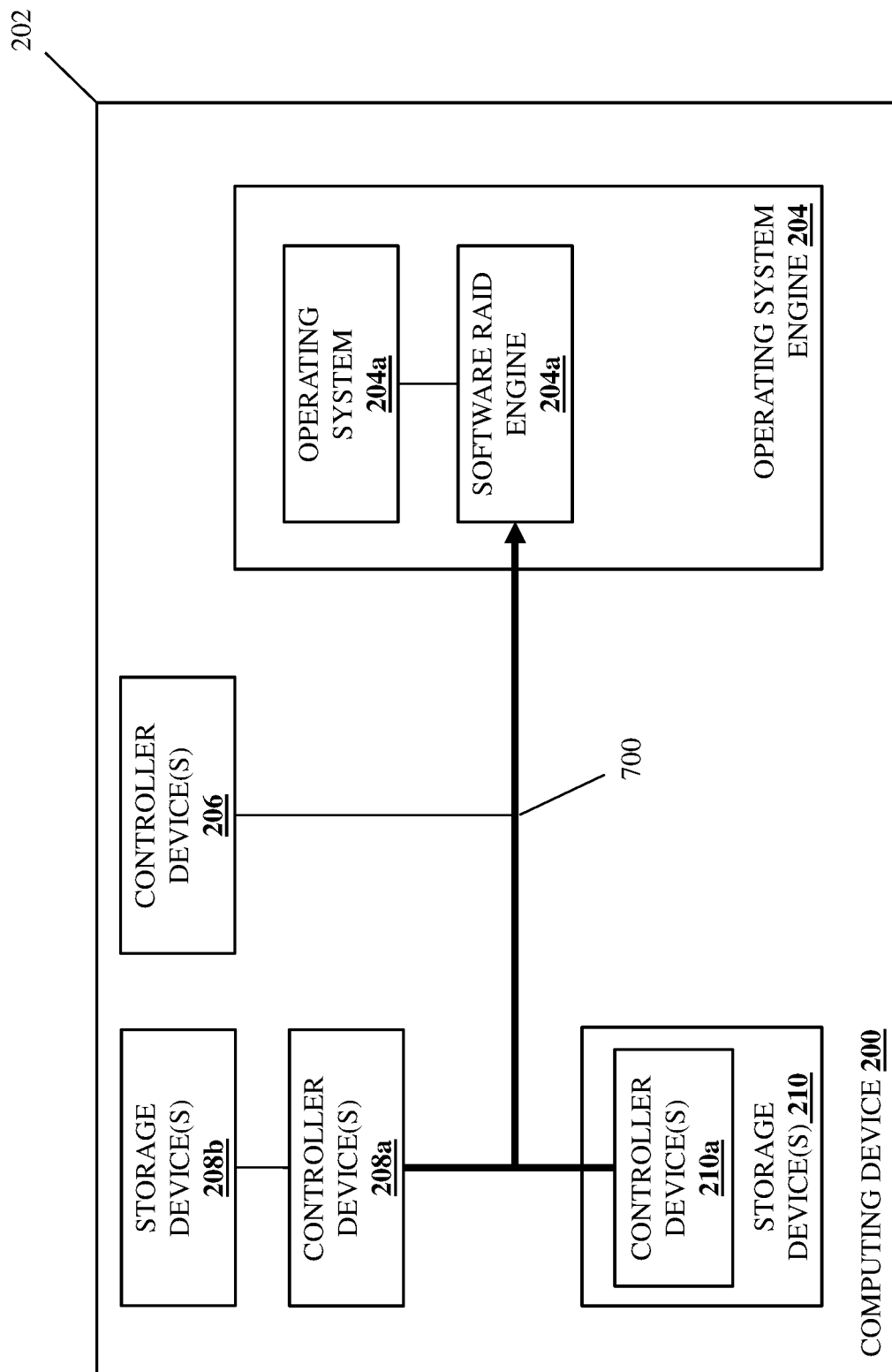
FIG. 7 is a schematic view illustrating an embodiment of the operation of the computing device of FIG. 2 during the method of FIG. 3.

If, at decision block 308, it is determined that there are no additional controller devices supported by the software RAID subsystem to register, the method 300 proceeds to block 310 where the software RAID subsystem creates one or more logical storage subsystems in the logical storage device. In an embodiment, at block 310 and in response to determining that there are no additional controller devices to register with the operating system 204b, the software RAID engine 204a in the computing device 200 may perform logical storage subsystem creation operations that may include creating one or more logical storage subsystems in the logical storage device provided by the storage devices 208b and 210. For example, with reference to FIG. 7, in some embodiments the logical storage subsystem creation operations may include the software RAID engine 204a performing metadata retrieval operations 700 that may include retrieving metadata from the controller devices 208a and 210a coupled to each of the storage devices 208b and 210 that are being used to provide the logical storage device.

As will be appreciated by one of skill in the art in possession of the present disclosure, the metadata retrieved from the controller devices 208a and 210a coupled to each of the storage devices 208b and 210 may identify one or more logical storage subsystems (e.g., virtual disks, RAID volumes, RAID Logical Unit Numbers (LUNs), and/or logical storage subsystems known in the art) that will be provided by each of the storage devices 208b and 210, as well as any other information that one of skill in the art in possession of the present disclosure would recognize as providing for the creation of the logical storage subsystems in the logical storage device. As such, at block 310, the logical storage subsystem creation operations performed by the software RAID engine 204a may include using the metadata retrieved from the controller devices 208a and 210a coupled to each of the storage devices 208b and 210 to "build", generate, and/or otherwise create one or more logical storage subsystems (e.g., virtual disks, RAID volumes, RAID LUNs, and/or logical storage subsystems known in the art) in the logical storage device that is provided by the storage devices 208b and 210. However, while a specific example of the creation of logical storage subsystem(s) in a logical storage device has been described, one of skill in the art in possession of the present disclosure will appreciate how the logical storage subsystems may be created in the logical storage device using a variety of techniques that will fall within the scope of the present disclosure as well.

Figure 8:
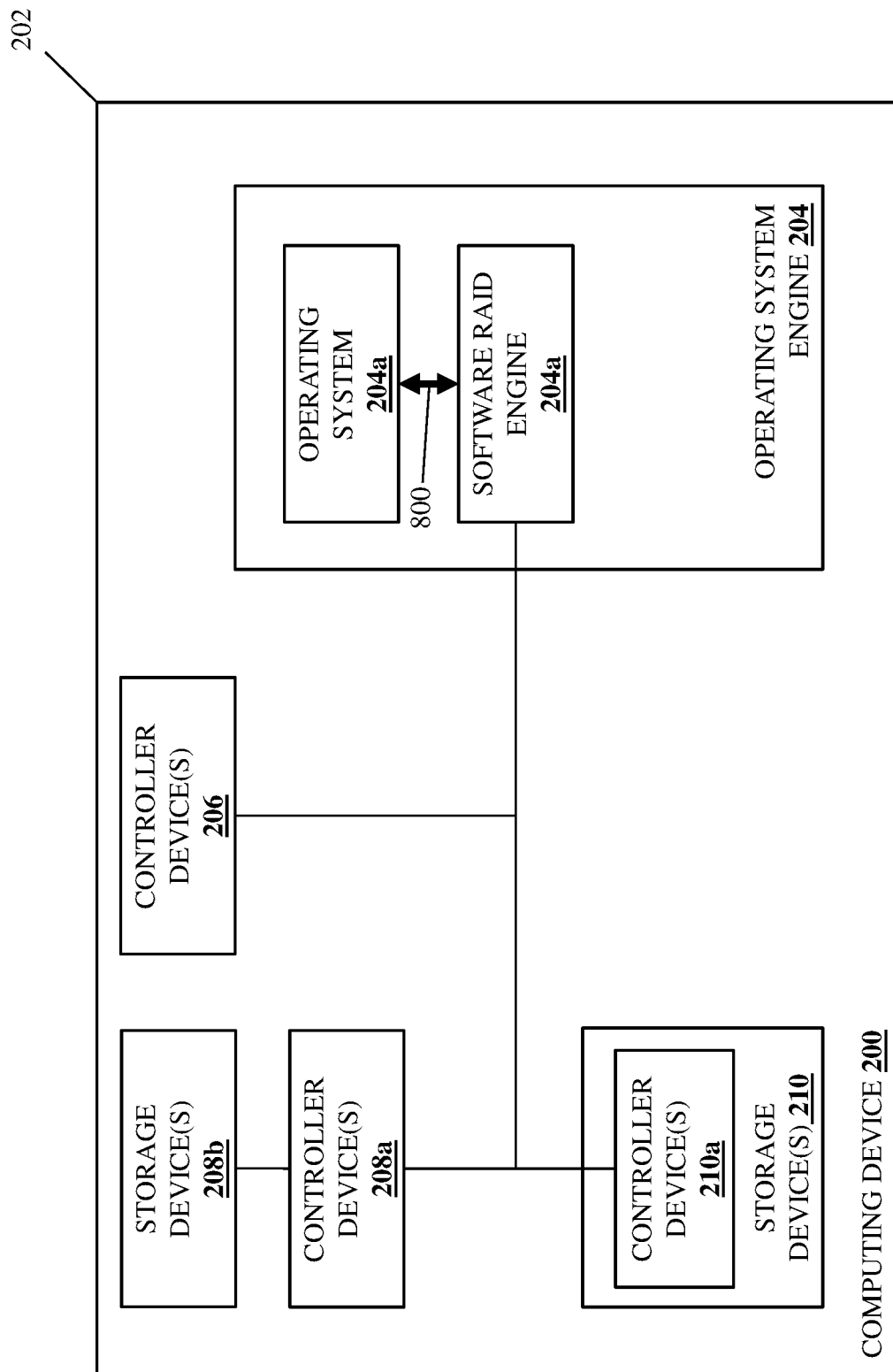
FIG. 8 is a schematic view illustrating an embodiment of the operation of the computing device of FIG. 2 during the method of FIG. 3.

The method 300 then proceeds to block 312 where the software RAID subsystem configures command communications with the operating system. With reference to FIG. 8, in an embodiment of block 312, the software RAID engine 204a in the computing device 200 may perform command communication configuration operations 800 that may include identifying a primary controller device from the plurality of controller devices 206, 208a, and 210a. For example, the controller device 206, 208a, or 210a identified as the primary controller device at block 312 may be a PCIe controller device that may have been designated by a computing device manufacturer to operate as the primary controller device based on that PCIe controller device being common to a variety of different configurations of computing devices provided by the computing device manufacturer (and thus being present in each of those computing devices/computing device configurations if needed to implement the direct-attached storage device software RAID system of the present disclosure). In another example, the controller device 206, 208a, or 210a identified as the primary controller device at block 312 may be a PCIe controller device that is not configured to be "hot removed" from the computing device 200. However, while a few specific examples of controller devices that may be identified as primary controller devices have been described, one of skill in the art in possession of the present disclosure will appreciate how any of a variety of criteria may be used to designate the controller device that may be identified as the primary controller device at block 312 while remaining within the scope of the present disclosure as well.

Following the command configuration operations at block 312, the direct-attached storage device software RAID system completes initialization such that the RAID volume provided by the logical storage device is configured for use, and one of skill in the art in possession of the present disclosure will appreciate how a full RAID volume or partial RAID volume may be configured via the method 300 as described above, and may be used for runtime data, during boot/initialization, and/or for other RAID volume uses that would be apparent to one of skill in the art in possession of the present disclosure.

Figure 9:
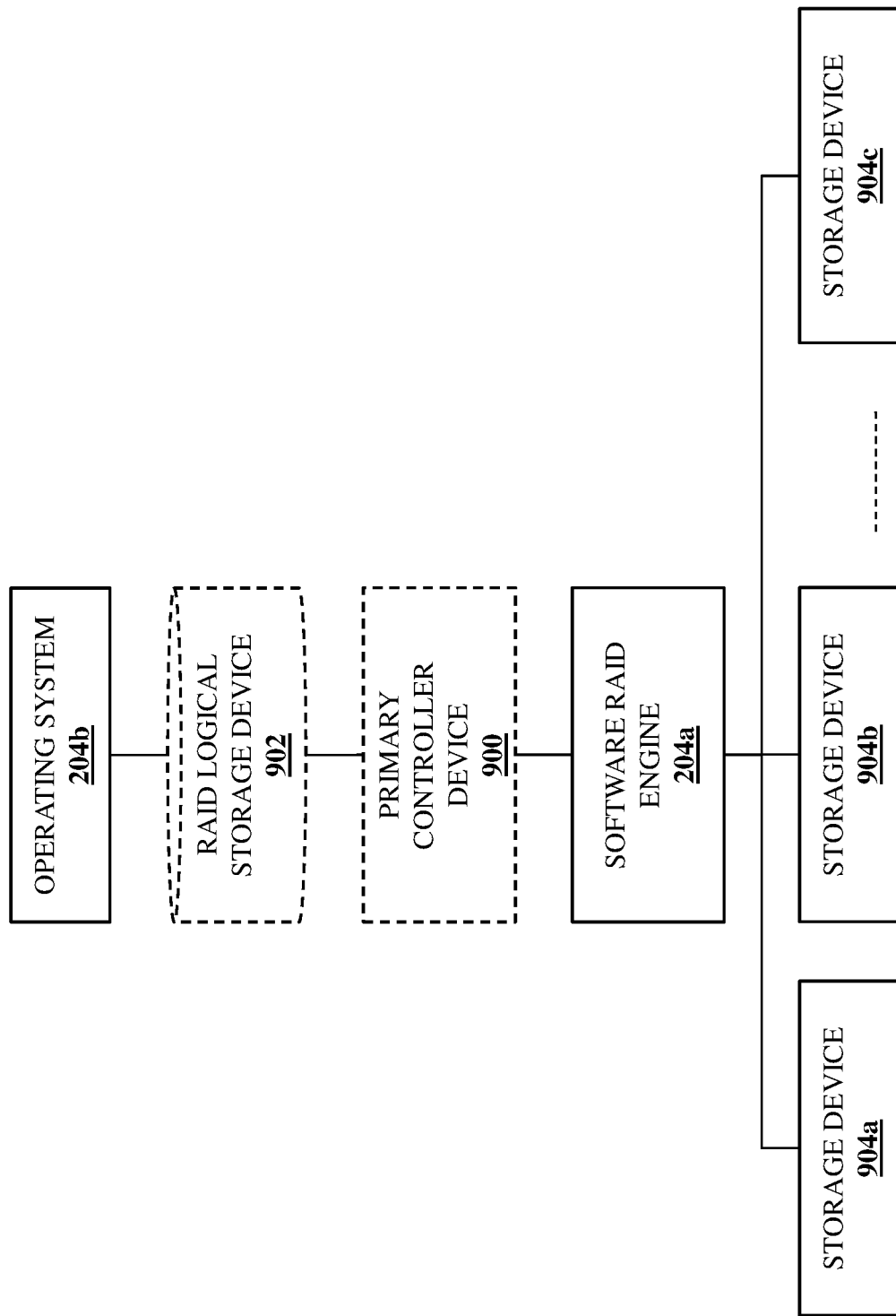
FIG. 9 is a schematic view illustrating an embodiment of the operation of the computing device of FIG. 2 during the method of FIG. 3.

The method 300 then proceeds to block 314 where the software RAID subsystem presents one of the controller devices to the operating system as a primary controller device that is connected to the logical storage device. With reference to FIG. 9, in an embodiment of block 314 and following the completion of the initialization of the direct-attached storage device software RAID system, the software RAID engine 204a may present, to the operating system 204b in the computing device 200, a primary controller device 900 (which as discussed above is provided by one of the controller devices 206, 208a, or 210a) as being connected to a RAID logical storage device 902 that is provided using a plurality of physical storage devices 904a, 904b, and up to 904c (which may be any of the storage devices 208a and 210 registered with the operating system 204b as discussed above).

To provide a specific example, one of the controller device(s) 206 that is not connected to a storage device may be presented to the operating system 204b as being connected to the RAID logical storage device 902, although one of skill in the art in possession of the present disclosure will appreciate how any one of the controller devices 208a or 210a may be presented to the operating system 204b as being connected to the RAID logical storage device 902 while remaining within the scope of the present disclosure as well. As will be appreciated by one of skill in the art in possession of the present disclosure, any of the controller devices 206, 208a, and 210a that are not presented to the operating system 204b as being connected to the RAID logical storage device 902 may instead be presented to the operating system 204b as secondary controller devices that are not connected to the RAID logical storage device 902 or any of the storage devices 904a-904c (i.e., despite at least some of those controller devices being physically connected to those storage devices 904a-904c).

As such, each of the logical storage subsystems (e.g., virtual disks, RAID volumes, RAID LUNs, and/or logical storage subsystems known in the art) provided by the RAID logical storage device 902 are exposed to the operating system 204b via the primary controller device 900. Thus, using some of the specific examples discussed above, each of the logical storage subsystems (e.g., virtual disks, RAID volumes, RAID LUNs, and/or logical storage subsystems known in the art) provided by storage devices 904a-904b may be presented to a user of the operating system provided by the operating system engine 204 as SCSI storage devices or otherwise being provided by SCSI storage devices.

Figure 10:
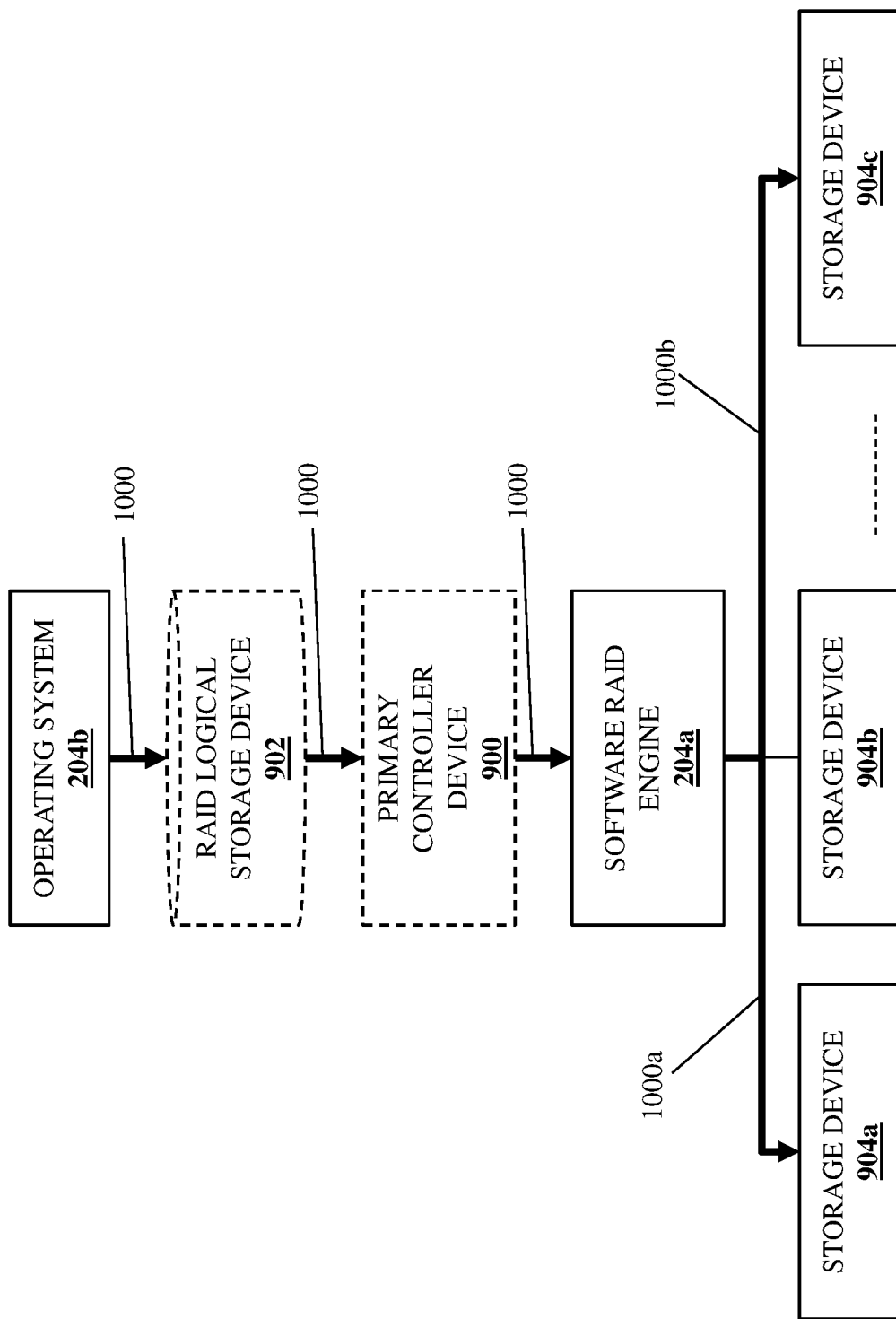
FIG. 10 is a schematic view illustrating an embodiment of the operation of the computing device of FIG. 2 during the method of FIG. 3.

The method 300 then proceeds to block 316 where the software RAID subsystem receives a command from the operating system that is directed to a primary controller device and that identifies a logical storage subsystem. With reference to FIG. 10, in an embodiment of block 316, the operating system 204b in the computing device 200 may perform command provisioning operations 1000 that include generating a command that identifies a logical storage subsystem provided by the RAID logical storage device 902, and transmitting that command to the primary controller device 900 that is presented as being connected to the RAID logical storage device 902, which one of skill in the art in possession of the present disclosure will appreciate will result that in that command being received by the software RAID engine 204a in the computing device 200. In an embodiment, the command transmitted by the operating system 204b to the software RAID engine 204a may include I/O commands such as a read command, a write command, and/or any other RAID commands that would be apparent to one of skill in the art in possession of the present disclosure.

Using the specific example provided above in which the software RAID engine 204a is provided by a SCSI-based driver, any commands received at block 316 by the software RAID engine 204a from the operating system 204b may be SCSI commands. Furthermore, as discussed in some of the specific examples above, the commands received at block 316 by the software RAID engine 204a from the operating system 204b may be mapped to protocol queues in the operating system 204b that are used to communicate with the software RAID engine 204a provided by the SCSI-based driver, and thus the software RAID engine 206a may receive those commands via the accessing of those protocols queues.

The method 300 then proceeds to block 318 where the software RAID subsystem transmits the command to a subset of physical storage devices that provide the logical storage subsystem via respective controller device(s) that couple the software RAID subsystem to that subset of physical storage devices. With continued reference to FIG. 10, in an embodiment of block 318, the software RAID engine 204a may perform command transmission operations 1000a and 1000b that, in the specific example illustrated in FIG. 10, includes transmitting the command received at block 316 to the storage device 904a and the storage device 904c via their respective controller device(s) (e.g., any of the controller device(s) 208a and 210a) based on those storage devices 904a and 904c providing the logical storage subsystem identified in the command received by the software RAID engine 204a from the operating system 204b. As will be appreciated by one of skill in the art in possession of the present disclosure, the commands 1000a and 1000b transmitted to the storage devices 904a and 904c may be provided by modified versions of the command 1000 received from the operating system 204b (e.g., SCSI commands received from the operating system 204b may be translated to a protocol supported by the controller device/storage device to which it is transmitted).

For example, in response to receiving the command from the operating system 204b in the computing device 200, the software RAID engine 204a in the computing device 200 may determine which of the storage devices 904a-904c provide the logical storage subsystem identified in that command (e.g., the storage devices 904a and 904c in this specific example). As discussed above, in some specific examples, protocol queues in the operating system 204b may be mapped to SAS, SATA, and/or NVMe protocol queues in the software RAID engine 204a, and thus the software RAID engine 204a may provide any commands received from the operating system 204b in the protocol queues associated with the protocol utilized by the storage devices that provide the logical storage subsystem to which those commands are directed. As such, the command received by the software RAID engine 204a from the operating system 204b may be placed in a protocol queue associated with the protocol used by the storage device 904a, as well as in a protocol queue associated with the protocol used by the storage device 904c.

In embodiments in which the software RAID engine 204a is provided by a SCSI-based driver and the commands received from the operating system 204b are SCSI commands, in the event the storage devices 904a and/or 904c are SAS storage devices or otherwise use the SAS protocol, SCSI commands may be placed in a SAS protocol queue in the software RAID engine 204a and then transmitted to the storage devices 904a and/or 904c via their respective controller device(s) (e.g., any of the controller device(s) 208a and 210a). However, in the event the storage devices 904a and/or 904c are SATA storage devices or otherwise use the SATA protocol, SCSI commands may be placed in a SATA protocol queue in the software RAID engine 204a, translated using a SCSI translation layer in the software RAID engine 204a (e.g., a SCSI-to-Frame Information Structure (FIS) translation), and then transmitted to the storage devices 904a and/or 904c via their respective controller device(s) (e.g., any of the controller device(s) 208a and 210a). Similarly, in the event the storage devices 904a and/or 904c are NVMe storage devices or otherwise use the NVMe protocol, SCSI commands may be placed in an NVMe protocol queue in the software RAID engine 204a, translated using a SCSI translation layer in the software RAID engine 204a (e.g., a SCSI-to-NVMe translation), and then transmitted to the storage devices 904a and/or 904c via their respective controller device(s) (e.g., any of the controller device(s) 208a and 210a).

However, while a few specific examples of the translation of commands received from the operating system 204b before providing them to the storage devices 904a-904c via their respective controller devices have been described, one of skill in the art in possession of the present disclosure will appreciate that other command translations may be performed while remaining within the scope of the present disclosure as well. For example, one of skill in the art in possession of the present disclosure will appreciate how a PCIe controller device connected to a SAS controller device will operate as a SAS controller that utilizes the SAS protocol, and thus no command translations may be needed in such situations. Similarly, a PCIe controller device connected to a SATA controller device will operate as a SATA controller that utilizes the SATA protocol, and thus SCSI-to-FIS translations may be needed in such situations.

The method 300 then returns to block 316. As such, the method 300 may loop such that the software RAID engine 204a in the computing device 200 receives commands from the operating system 204b in the computing device 200 and transmits those commands to the storage devices 904a-904c via their respective controllers as long as the storage devices 904a-904c are being used to provide the RAID logical storage device 902 to the operating system 204b. While not described in detail herein, in the event the storage devices 904a-904c will no longer be used to provide the RAID logical storage device 902 to the operating system 204b, the software RAID engine 204a may disconnect the controller device(s) 206, 208a, and 210a from the operating system 204b, as well as perform any other operations that would be apparent to one of skill in the art in possession of the present disclosure.

Thus, systems and methods have been described that provide for the presentation by a SCSI-based software RAID driver to an operating system of a single, primary PCIe controller device as being connected to a RAID logical storage device provided by a plurality of SAS, SATA, and/or NVMe physical storage devices, with the SCSI-based software RAID driver receiving I/O commands from the operating system that are directed to the primary PCIe controller device and that identify a RAID logical storage subsystem that is included in the RAID logical storage device, and transmitting those commands to a subset of the SAS, SATA, and/or NVMe physical storage devices that provide that RAID logical storage subsystem via respective PCIe controller device(s) that couple the SCSI-based software RAID driver to that subset of SAS, SATA, and/or NVMe physical storage devices. As such, software RAID support in operating systems like the WINDOWS® operating system discussed above is enabled in direct-attached storage device configurations for any types of storage devices and any types of CPUs, thus allowing the creation of a RAID using any available storage devices in a variety of computing devices. As such, RAID systems may be configured from a larger variety of storage devices and using spanned PCIe controllers, addressing several issues with the conventional RAID systems discussed above.

However, the inventors of the present disclosure have recognized that the presentation to the WINDOWS® operating system of the single, primary controller device raises some issues with the operation of the direct-attached storage device software RAID system. For example, WINDOWS® operating systems in server devices include "hibernation" functionality that allow the WINDOWS® operating system to put the server device into a low power state by "unloading" device drivers and putting their associated devices into a low power state. As will be appreciated by one of skill in the art, when entering a hibernation mode, WINDOWS® operating systems are configured to load a "Storport" storage port driver, along with a "miniport" storage driver for the boot controller device (i.e., the controller device coupled to the storage device that stores the boot LUN), but WINDOWS® operating systems are not configured to not load miniport storage drivers for any other controller devices.

As such, when the WINDOWS® operating system is utilized in the direct-attached storage device software RAID system discussed above and the hibernation mode is entered, the WINDOWS® operating system will load a miniport storage driver for the primary controller device (which is presented to the WINDOWS® operating system as being connected to the logical storage device that includes the boot LUN), but will not load miniport storage drivers for any of the secondary controller devices that may control storage devices that store the boot LUN. As will be appreciated by one of skill in the art in possession of the present disclosure, this will result in the secondary controller devices being placed into the low power state discussed above during the hibernation mode, and in the event any of those secondary controller devices control storage devices that store at least a portion of the boot LUN, those portions of the boot LUN will not be accessible (i.e., those portions of the boot LUN will not be exposed during the hibernation mode). As a result, hibernation information will not be written to those portions of the boot LUN during the hibernation mode, and subsequent resume operations following the hibernation mode will fail.

Figure 11:
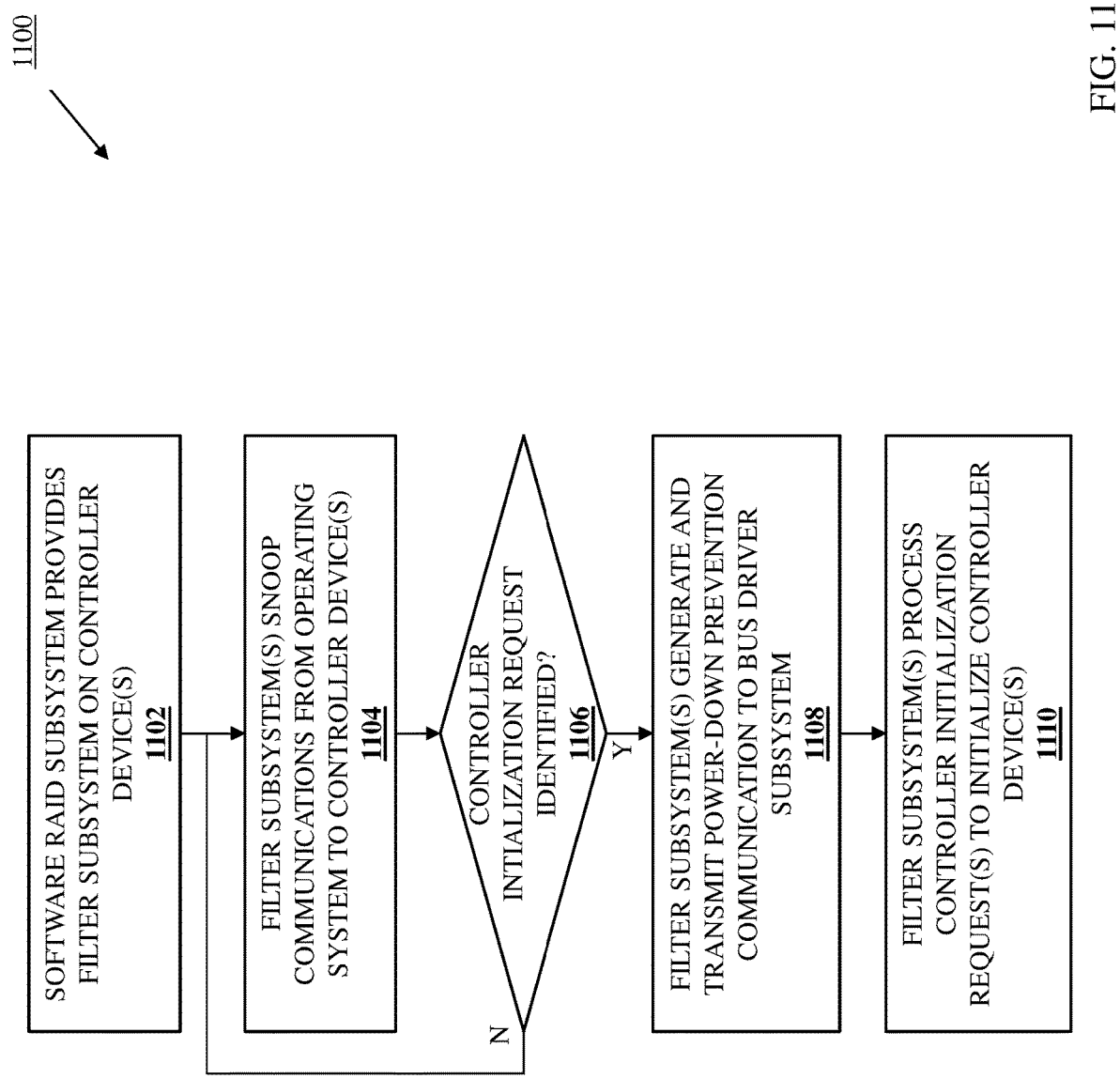
FIG. 11 is a flow chart illustrating an embodiment of a method for preparing for hibernation in a software RAID using direct-attached storage devices in a computing device.

Referring now to FIG. 11, a method 1100 for preparing for hibernation in a software Redundant Array of Independent Disk (RAID) using direct-attached storage devices in a computing device is illustrated. As discussed below, the systems and methods of the present disclosure prevent the powering down of controller devices that control storage devices that provide a boot logical storage subsystem during a hibernation mode, which as discussed below allows those storage devices/that boot logical storage subsystem to be initialized in the hibernation mode such that they may be accessed for hibernation operations. For example, the direct-attached storage device software RAID hibernation system of the present disclosure may include a chassis having an operating system, a bus driver subsystem, controller devices coupled to physical storage devices, and a software RAID subsystem coupled to the operating system and the controller devices. While in a runtime mode, the software RAID subsystem presents the operating system a primary controller device as being connected to a logical storage device provided by the physical storage devices, and provides a filter subsystem in a secondary controller device that controls at least one of the physical storage devices. While in the runtime mode, the filter subsystem identifies a controller initialization request from the operating system that requests initialization of the secondary controller device and, in response, transmits a power-down prevention communication to the bus driver subsystem that is configured to prevent the bus driver subsystem from powering down the secondary controller device during a hibernation mode. As such, secondary controller devices that provide a boot logical storage subsystem in the direct-attached storage device software RAID system of the present disclosure may be prevented from being powered down in a hibernation mode, which as discussed below allow those secondary controller devices to be initialized such that hibernation operations are enabled in the hibernation mode.

Figure 12:
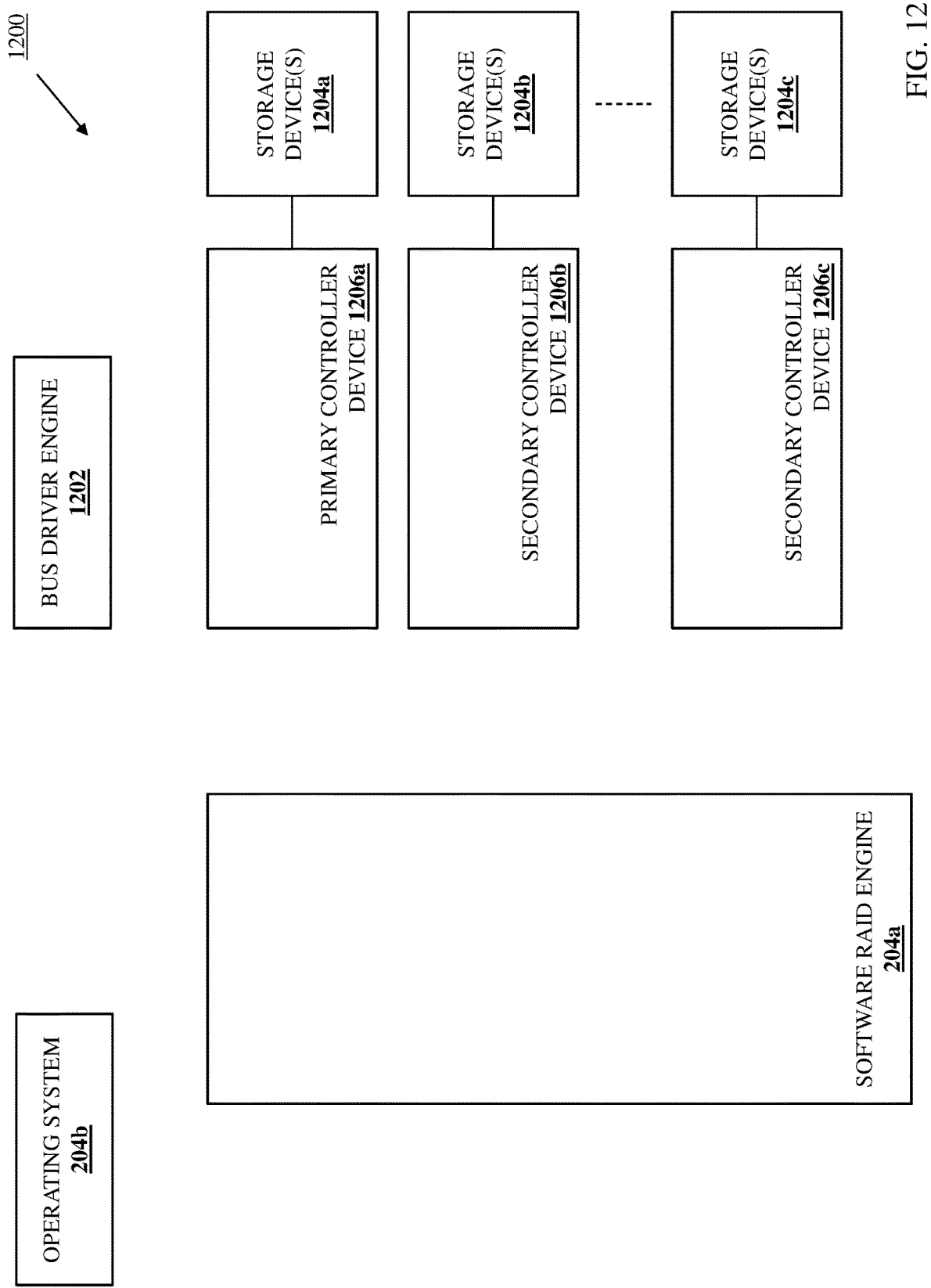
FIG. 12 is a schematic view illustrating an embodiment of the operation of the computing device of FIG. 2 during the method of FIG. 11.

The method 1100 begins at block 1102 where a software RAID subsystem provides a respective filter subsystem on at least one controller device. With reference to FIG. 12, an embodiment of a computing device 1200 that may be provided by the computing device 200 of FIG. 2 is illustrated for use in the discussions below. As can be seen, the computing device 1200 includes the software RAID engine 204a and the operating system 204b discussed above with reference to FIG. 2. In addition, the computing device 1200 may include a bus driver engine 1202 that may be provided by a bus processing system and a bus memory system that includes instructions that, when executed by the bus processing system, cause the bus processing system to perform the functionality of the bus driver engines and/or bus driver subsystems discussed below. In a specific example, the bus driver engine 1202 may be configured to provide a Peripheral Component Interconnect express (PCIe) bus driver, although one of skill in the art in possession of the present disclosure will appreciate how other bus driver engines/bus drivers will fall within the scope of the present disclosure as well.

Furthermore, the computing device 1200 also includes a plurality of storage devices 1204a, 1204b, and up to 1204c, each of which may be provided by the storage devices 208b and/or 210 discussed above, and one of skill in the art in possession of the present disclosure will appreciate how those storage devices 1204a-1204c may be configured to provide a logical storage device as described above. As illustrated, a primary controller device 1206a is connected to the storage device(s) 1204a and may be provided by any of the controller devices 206, 208a, and 210a; a secondary controller device 1206b is connected to the storage device(s) 1204b and may be provided by any of the controller devices 206, 208a, and 210a; and up to a secondary controller device 1206c is connected to the storage device(s) 1204c and may be provided by any of the controller devices 206, 208a, and 210a, and one of skill in the art in possession of the present disclosure will recognize that the primary controller device 1206a and the secondary controller devices 1206b-1206c may be designated as "primary" and "secondary" according to the teachings of the present disclosure described above. Furthermore, as discussed above, the primary controller device 1206a need not be connected to storage devices while remaining within the scope of the present disclosure as well.

Finally, in the examples below, at least one of the storage devices 1204b and at least one of the storage devices 1204c is configured to provide a boot logical storage subsystem (e.g., a boot LUN) on the logical storage device provided by the storage devices 1204a-1204c. However, while a specific example is provided, one of skill in the art in possession of the present disclosure will appreciate how only a single secondary controller device may be connected to storage device(s) that provide the boot logical storage subsystem on the logical storage device while remaining within the scope of the present disclosure as well.

Figure 13:
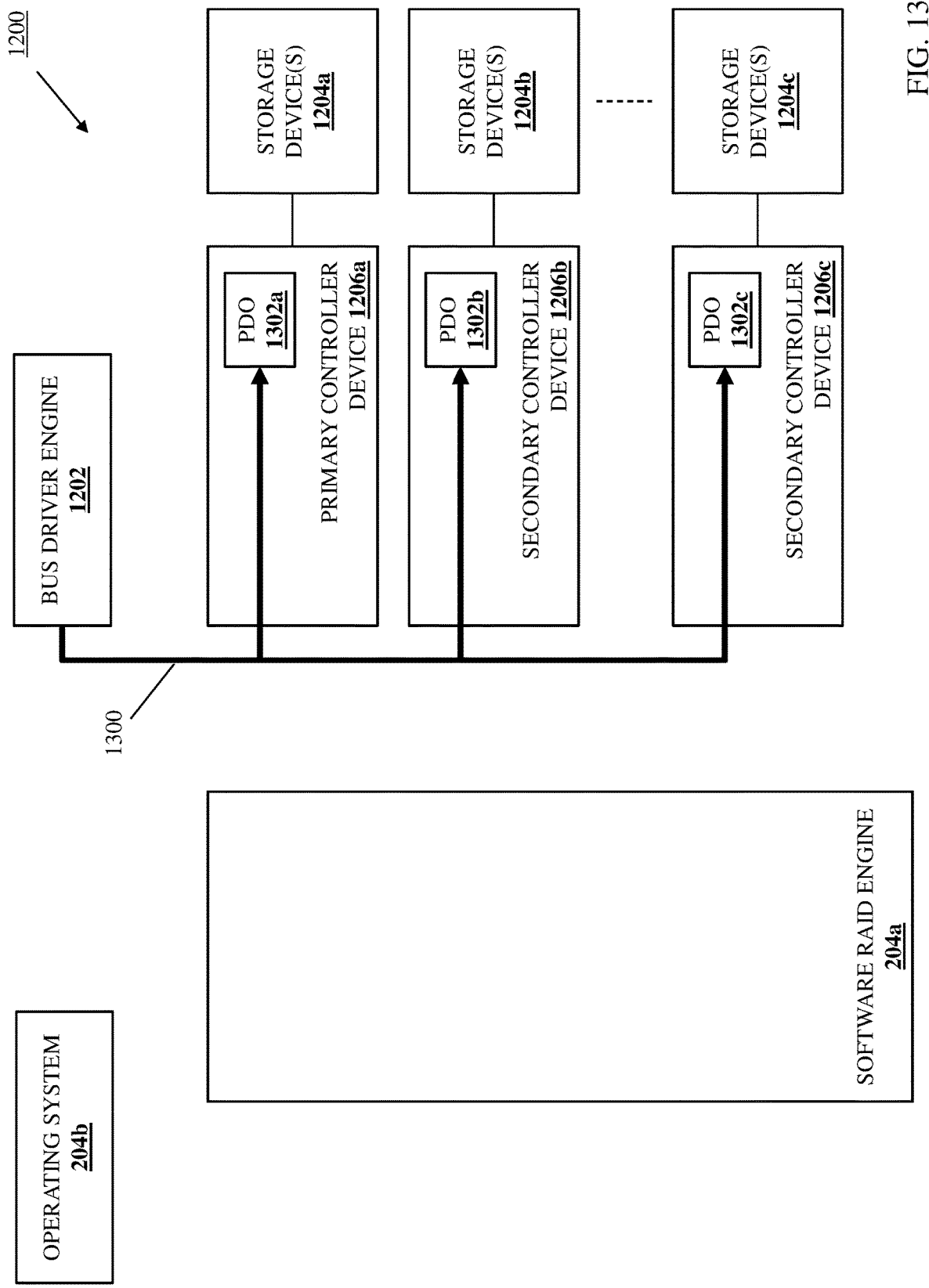
FIG. 13 is a schematic view illustrating an embodiment of the operation of the computing device of FIG. 12 during the method of FIG. 11.

With reference to FIG. 13, in an embodiment and during or prior to the method 1100, the bus driver engine 1202 may perform controller device configuration operations 1300 that include configuring each of the primary controller device 1206a and the secondary controller devices 1206b-1206c to communicate with the operating system 204b. For example, as illustrated in FIG. 13 and during initialization operations for the computing device 1200, the controller device configuration operations 1300 may include the bus driver engine 1202 creating a Physical Device Object (PDO) 1302a for the primary controller device 1206a, and a respective PDO 1302b-1302c for each of the secondary controller devices 1206b-1206c, and one of skill in the art in possession of the present disclosure will appreciate how the operating system 204b may view each of the primary controller device 1206a and the secondary controller devices 1206b-1206c as its respective PDO 1302a and 1302b-1302c. However, while specific operating system communication controller device configuration operations have been described, one of skill in the art in possession of the present disclosure will appreciate how the primary and secondary controller devices may be configured in a variety of manners to enable the functionality described below while remaining within the scope of the present disclosure.

Figure 14:
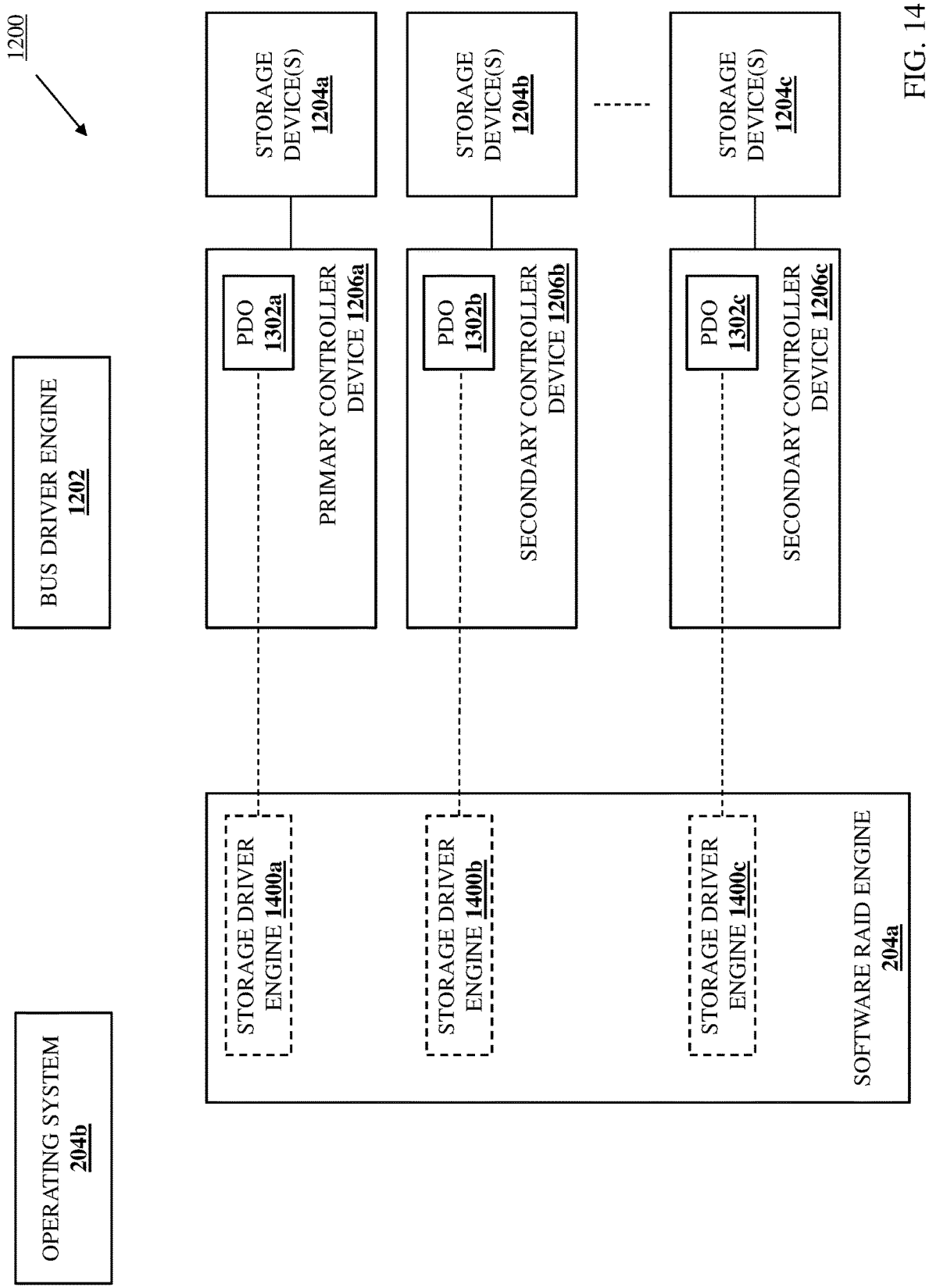
FIG. 14 is a schematic view illustrating an embodiment of the operation of the computing device of FIG. 12 during the method of FIG. 11.

With reference to FIG. 14, in an embodiment of block 1102 and as part of initialization operations for the computing device 1200, the operating system 204b may perform storage driver engine provisioning operations that may include providing a storage driver engine 1400a for the primary controller device 1206a, and providing a respective storage driver engine 1400b-1400c for each secondary controller device 1206b-1206c. For example, the operating system 204b may provide instructions on a memory system in each of the primary controller device 1206a and the secondary controller devices 1206b-1206c that, when executed by a processing system on each of the primary controller device 1206a and the secondary controller devices 1206b-1206c, cause those processing systems to provide the storage driver engines 1400a and 1400b-1400c, respectively, that are configured to perform the functionality of the storage driver engines, storage driver subsystems, and/or storage drivers discussed below.

As such, while the software driver engines 1400a and 1400b-1400c are illustrated in FIG. 14 as being "included in" the software RAID engine 204a, one of skill in the art in possession of the present disclosure will appreciate how the storage driver engines 1400a and 1400b-1400c may be provided by processing system/memory system combinations in the primary controller device 1206a and the secondary controller devices 1206b-1206c, respectively. In a specific example, the storage driver engines 1400a and 1400b-1400c may be configured to provide respective miniport drivers that may be loaded on the PDO 1302a and 1302b-1302c, respectively, (as illustrated by the dashed lines in FIG. 14) for each of the primary controller device 1206a and the secondary controller devices 1206b-1206c, respectively, although one of skill in the art in possession of the present disclosure will recognize how other storage driver engines will fall within the scope of the present disclosure as well.

Figure 15:
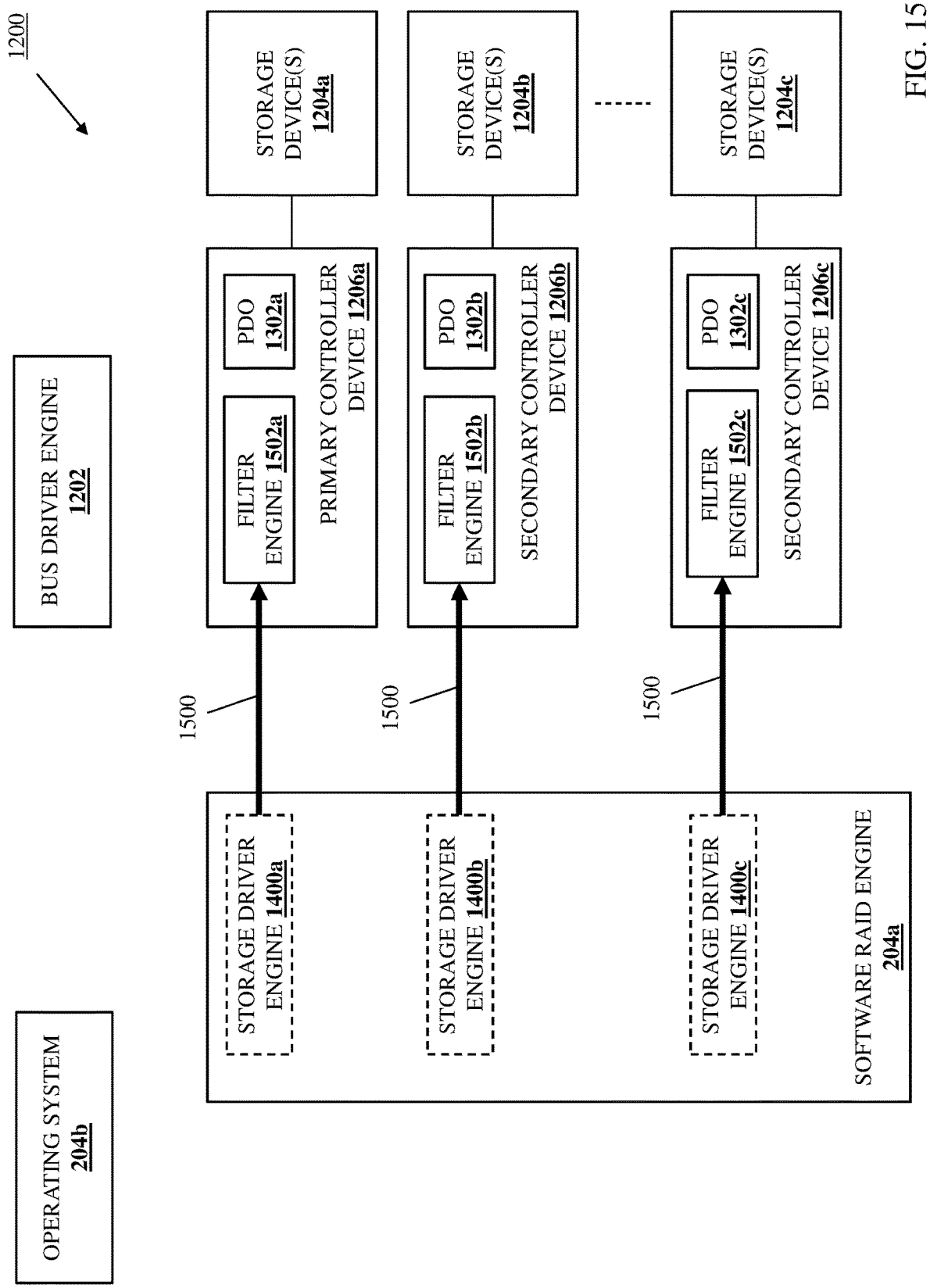
FIG. 15 is a schematic view illustrating an embodiment of the operation of the computing device of FIG. 12 during the method of FIG. 11.

With reference to FIG. 15, in an embodiment of block 1102 and as part of initialization operations for the computing device 1200, the storage driver engines 1400a and 1400b-1400c may each perform filter engine provisioning operations 1500 that may include providing respective filter engines 1502a and 1502b-1502c on the primary controller device 1206a and the secondary controller devices 1206b-1206c, respectively. For example, the storage driver engines 1400a and 1400b-1400c may provide instructions on a memory system in each of the primary controller device 1206a and the secondary controller devices 1206b-1206c that, when executed by a processing system on each of the primary controller device 1206a and the secondary controller devices 1206b-1206c, cause those processing systems to provide the filter engines 1502a and 1502b-1502c, respectively, that are configured to perform the functionality of the filter engines, filter subsystems, and/or filter drivers discussed below. In a specific example, the filter engines 1502a and 1502b-1502c may be configured to provide lower filter drivers that are configured to snoop communications transmitted by the operating system 204b, identify controller initialization requests from the operating system 204b, generate and transmit power-down prevention communications, and process controller initialization requests as described below, and/or perform any other operations that one of skill in the art in possession of the present disclosure would recognize as providing for the functionality described below. However, while specific filter engines have been described, one of skill in the art in possession of the present disclosure will appreciate how a variety of engines may provide the filter engine functionality described below while remaining within the scope of the present disclosure as well.

Figure 16:
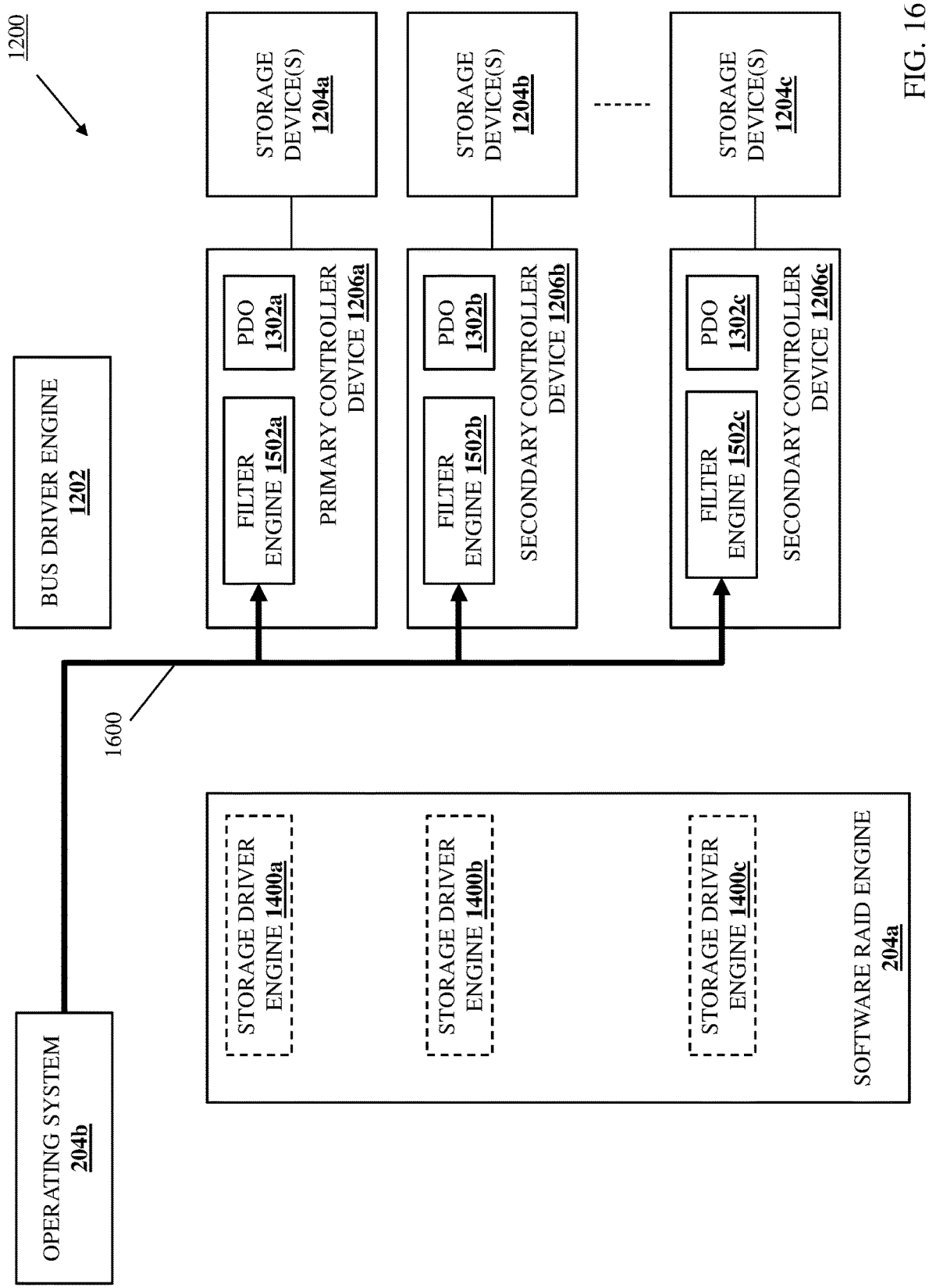
FIG. 16 is a schematic view illustrating an embodiment of the operation of the computing device of FIG. 12 during the method of FIG. 11.

The method 1100 then proceeds to block 1104 where the filter subsystem(s) snoop communications from an operating system to the controller device(s). With reference to FIG. 16, in an embodiment of block 1104 and as part of initialization operations for the computing device 1200, the operating system 204b may perform operating system/controller device communication operations 1600 that include generating and transmitting communications to any of the PDOs 1302a and 1302b-1302c for any of the primary controller device 1206a and the secondary controller devices 1206b-1206c, respective. As illustrated, at block 1104, the filter engines 1502a and 1502b-1502c in the primary controller device 1206a and the secondary controller devices 1206b-1206c, respectively, may receive those communications and perform "snooping" operations on those communications, which as discussed below may be configured to identify controller initialization requests from the operating system 204b. However, while snooping operations to identify particular communications are described herein, one of skill in the art in possession of the present disclosure will appreciate how the filter engines 1502a and 1502b-1502c may snoop for other communications while remaining within the scope of the present disclosure as well.

The method 1100 then proceeds to decision block 1106 where the method 1100 proceeds depending on whether a controller initialization request has been identified. One of skill in the art in possession of the present disclosure will appreciate how, in an embodiment of decision block 1106, the snooping operations performed by the filter engines 1502a and 1502b-1502c in the primary controller device 1206a and the secondary controller devices 1206b-1206c, respectively, may be performed on any communications transmitted as part of the operating system/controller device communication operations 1600 by the operating system 204b. If, at decision block 1106, no controller initialization request is identified, the method 1100 returns to block 1104. For example, one of skill in the art in possession of the present disclosure will appreciate how any communications transmitted as part of the operating system/controller device communication operations 1600 by the operating system 204b that are not controller initialization requests will be ignored by the filter engines 1502a and 1502b-1502c and/or provided to their destination. As such, the method 1100 may loop such that the filter engines 1502a and 1502b-1502c continue to snoop communications from the operating system 204b until a controller initialization request is identified.

If, at decision block 1106, a controller initialization request is identified, the method 1100 proceeds to block 1108 where the filter subsystem(s) generate and transmit a power down prevention communication to a bus driver subsystem. In an embodiment, at decision block 1106 and as part of initialization operations for the computing device 1200, any of the filter engines 1502a and 1502b-102c in the primary controller device 1206a and the secondary controller devices 1206b-1206c, respectively, may identify a controller initialization in communications received (and snooped from) the operating system 204b. In a specific example, at decision block 1106 an operating system Plug-and-Play (PnP) manager in the operating system 204b may generate and transmit an Input/output Request Packet (IRP) that provides power/PnP communication that includes a controller initialization request that is configured to request the initialization of the primary controller device 1206a and/or the secondary controller device(s) 1206b-1206c (e.g., an IRP that includes a type "IRP_MJ_PNP" and a function code "IRP_MN_START_DEVICE"), and its corresponding filter engines 1502a and 1502b-1502c, respectively, may identify that controller initialization request (e.g., the IRP with the function code "IRP_MN_START_DEVICE") as part of its snooping operations.

Figure 17:
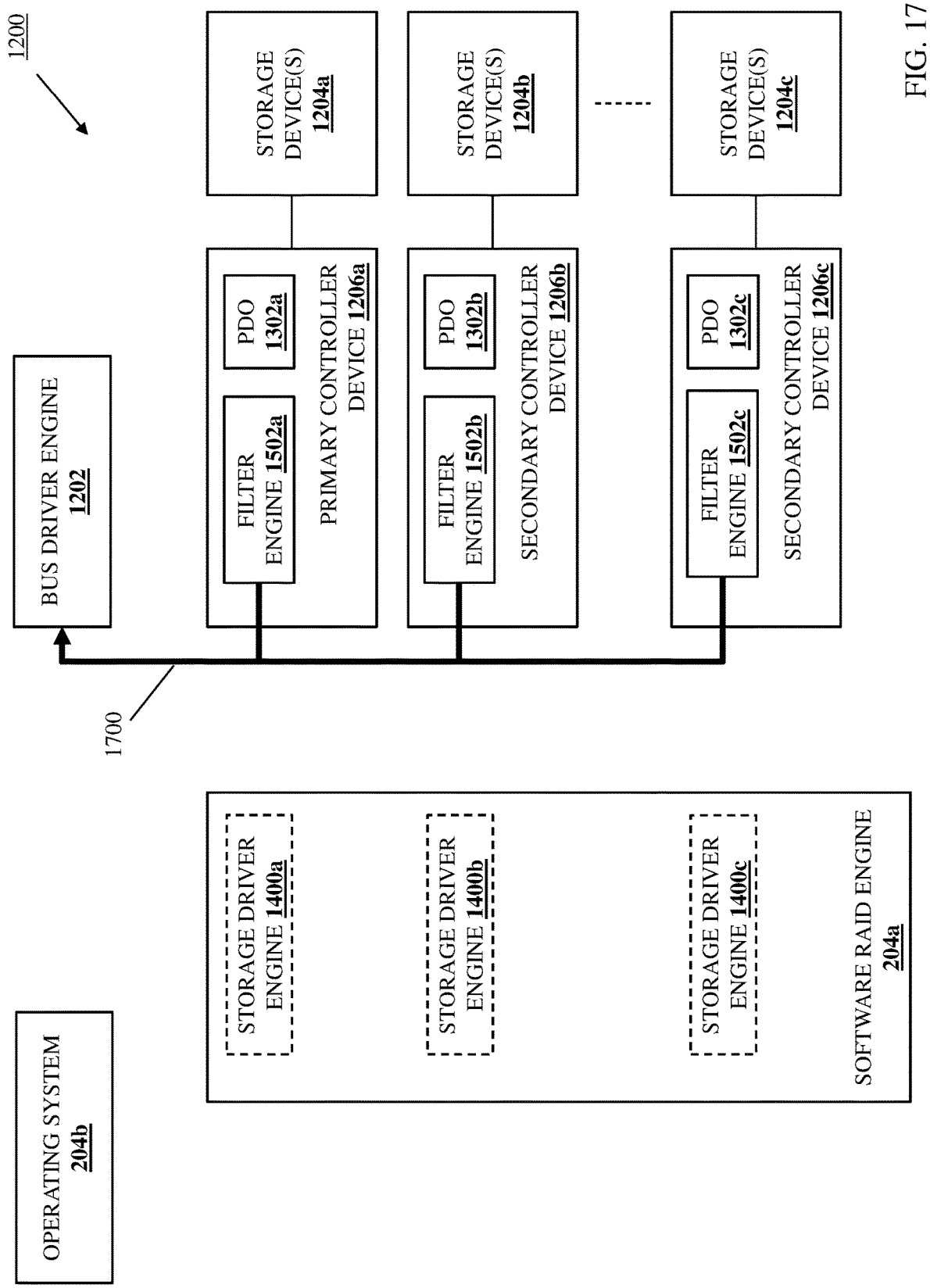
FIG. 17 is a schematic view illustrating an embodiment of the operation of the computing device of FIG. 12 during the method of FIG. 11.

With reference to FIG. 17, in an embodiment of block 1108 and in response to identifying the controller initialization request, any of the filter engines 1502a and 1502b-1502c in the primary controller device 1206a and the secondary controller devices 1206b-1206c, respectively, may perform power down prevention communication transmission operations 1700 that may include generating and transmitting a power down prevention communication to the bus driver engine 1202. For example, in response to identifying a controller initialization request (e.g., the IRP with the function code "IRP_MN_START_DEVICE"), any of the filter engines 1502a and 1502b-1502c in the primary controller device 1206a and the secondary controller devices 1206b-1206c, respectively, may generate an IRP that provide a power/PnP communication that includes a power down prevention communication that is configured to prevent the bus driver engine 1202 from powering down its primary controller device 1206a and the secondary controller devices 1206b-1206c, respectively. For example, the IRP generated at block 1108 by any of the filter engines 1502a and 1502b-1502c may include a type "IRP_MN_DEVICE_USAGE_NOTIFICATION", and have its device usage notification type parameter set to "DeviceUsageTypePaging", and one of skill in the art in possession of the present disclosure will appreciate how such an IRP is configured to inform the bus driver engine 1202 that a controller device is holding a page file (i.e., "Pagefile"), which will prevent the bus driver engine 1202 from powering that controller device down during a hibernation mode for the computing device 1200.

As such, in some embodiment and in response to receiving an IRP to initialize its primary controller device 1206a and/or the secondary controller devices 1206b-1206c, respectively, the filter engine 1502a and/or 1502b-1502c receiving that IRP is configured to generate an IRP that is configured to "trick" the bus driver engine 1202 (e.g., a PCI bus driver) into believing that that controller device is holding a page file in order to prevent the bus driver engine 1202 from powering down that controller device during a hibernation mode for the computing device 1200. In response to receiving the power down prevention communication from any of the filter engines 1502a and 1502b-1502c in the primary controller device 1206a and the secondary controller devices 1206b-1206c, respectively, the bus driver engine 1202 may operate to prevent subsequent powering down of that controller during a hibernation mode for the computing device 1200 by for example, removing a "DO_POWER_PAGABLE" bit from the PDO 1302a and/or 1302b-1302c for the primary controller device 1206a and/or the secondary controller devices 1206b-1206c, respectively. However, while specific examples of the prevention of the powering down of controller devices during a hibernation mode has been described, one of skill in the art in possession of the present disclosure will appreciate how other techniques for preventing the powering down of controller devices will fall within the scope of the present disclosure as well.

Figure 18:
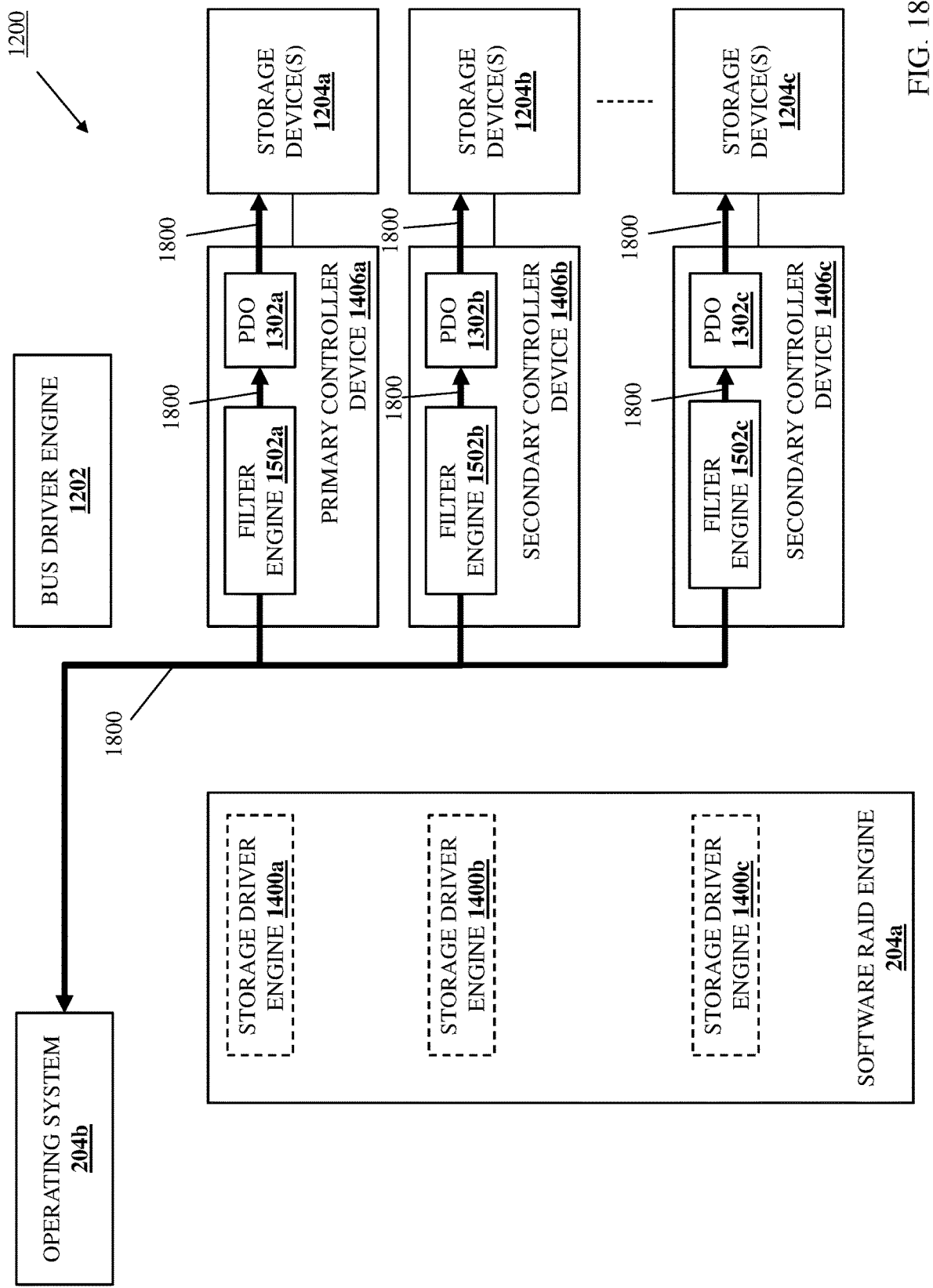
FIG. 18 is a schematic view illustrating an embodiment of the operation of the computing device of FIG. 12 during the method of FIG. 11.

The method 1100 then proceeds to block 1110 where the filter subsystem(s) process the controller initialization request(s) to initialize the controller device(s). With reference to FIG. 18, in an embodiment of block 1110 and as part of initialization operations for the computing device 1200, any of the filter engines 1502a and 1502b-1502c in the primary controller device 1206a and the secondary controller devices 1206b-1206c, respectively, may perform controller initialization request processing operations 1800 that may include any processing operations on the controller initialization request (e.g., the IRP with the function code "IRP_MN_START_DEVICE") received at decision block 1106 that one of skill in the art in possession of the present disclosure would recognize as providing for the initialization of connected storage devices 1204a and/or 1204b-1204c, and responding to the operating system 204b (e.g., the operating system PnP manager) for the controller initialization request(s). As will be appreciated by one of skill in the art in possession of the present disclosure, following block 1110 the computing device may enter a runtime mode in which the computing device 1200 is controlled by the operating system 204b.

Thus, systems and methods have been described that prevent the powering down of controller devices that control storage devices that provide a boot logical storage subsystem during a hibernation mode, which as discussed below allows those storage devices/that boot logical storage subsystem to be initialized in the hibernation mode such that they may be accessed for hibernation operations. For example, the direct-attached storage device software RAID hibernation system of the present disclosure may include a chassis having an operating system, a bus driver subsystem, controller devices coupled to physical storage devices, and a software RAID subsystem coupled to the operating system and the controller devices. While in a runtime mode, the software RAID subsystem presents the operating system a primary controller device as being connected to a logical storage device provided by the physical storage devices, and provides a filter subsystem in a secondary controller device that controls at least one of the physical storage devices. While in the runtime mode, the filter subsystem identifies a controller initialization request from the operating system that requests initialization of the secondary controller device and, in response, transmits a power-down prevention communication to the bus driver subsystem that is configured to prevent the bus driver subsystem from powering down the secondary controller device during a hibernation mode.

As such, secondary controller devices that provide a boot logical storage subsystem in the direct-attached storage device software RAID system of the present disclosure may be prevented from being powered down in a hibernation mode, which as discussed below allow those secondary controller devices to be initialized such that hibernation operations are enabled in the hibernation mode. However, the initialization of secondary controller devices during hibernation mode in the direct-attached storage device software RAID system of the present disclosure can raise some issues.

For example, in server devices providing the direct-attached storage device software RAID system discussed above, the WINDOWS® operating system will be installed on a boot logical storage subsystem (e.g., a boot Logical Unit Number (LUN)) in the logical storage device that will be exposed via a "boot controller device" provided by the primary controller device discussed above. When entering a hibernation mode, the WINDOWS® operating system will load a "Storport" driver to communicate with the boot controller device/primary controller device via a boot controller miniport driver that was also loaded by the WINDOWS® operating system. However, the operating system will not load miniport drivers for any of the secondary controller devices. As such, when the boot logical storage subsystem is provided by any storage devices controlled by the secondary controller devices (e.g., when the boot LUN is a virtual drive provided by a Non-Volatile Memory express (NVMe) storage device controlled by a secondary controller device, by a spanned virtual drive provided by multiple storage devices connected to different secondary controller devices, etc.), those storage devices will not be initialized (i.e., due to the lack of loading of miniport drivers for their secondary controller devices), hibernation information will not be written to those storage device, and resume operations following hibernation will fail.

Figure 19:
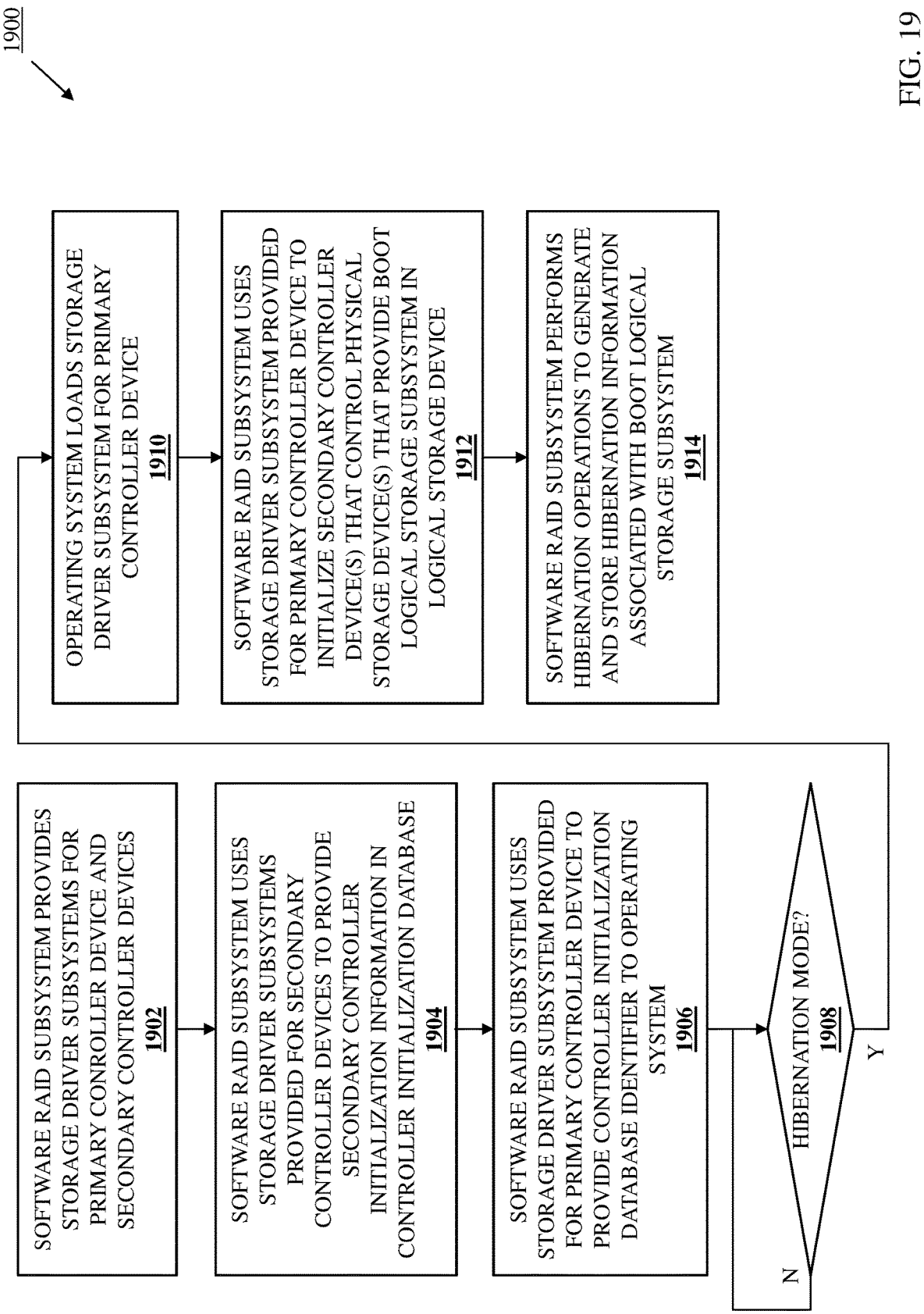
FIG. 19 is a flow chart illustrating an embodiment of a method for providing for hibernation in a software RAID using direct-attached storage devices in a computing device.

Referring now to FIG. 19, a method 1900 for providing hibernation in a software Redundant Array of Independent Disk (RAID) using direct-attached storage devices in a computing device is illustrated. As discussed below, the systems and methods of the present disclosure provide for the initialization of secondary controller device(s) that control storage device(s) that provide a boot logical storage subsystem while in a hibernation mode. For example, the direct-attached storage device software RAID hibernation system of the present disclosure may include a chassis housing a software RAID subsystem coupled to each of a plurality of physical storage devices, each of a plurality of controller devices, and an operating system. While in a runtime mode, the software RAID subsystem presents the operating system with a primary controller device from the plurality of controller devices as being connected to a logical storage device provided by the plurality of physical storage devices. In response to entering a hibernation mode from the runtime mode, the software RAID subsystem provides a storage driver subsystem for the primary controller device and uses it to initialize at least one secondary controller device in the plurality of controller devices that controls at least one of the plurality of physical storage devices that provides a boot logical storage subsystem in the logical storage device. As such, hibernation for operating systems like the WINDOWS® operating system discussed above are enabled in the direct-attached storage device software RAID system of the present disclosure.

Figure 20:
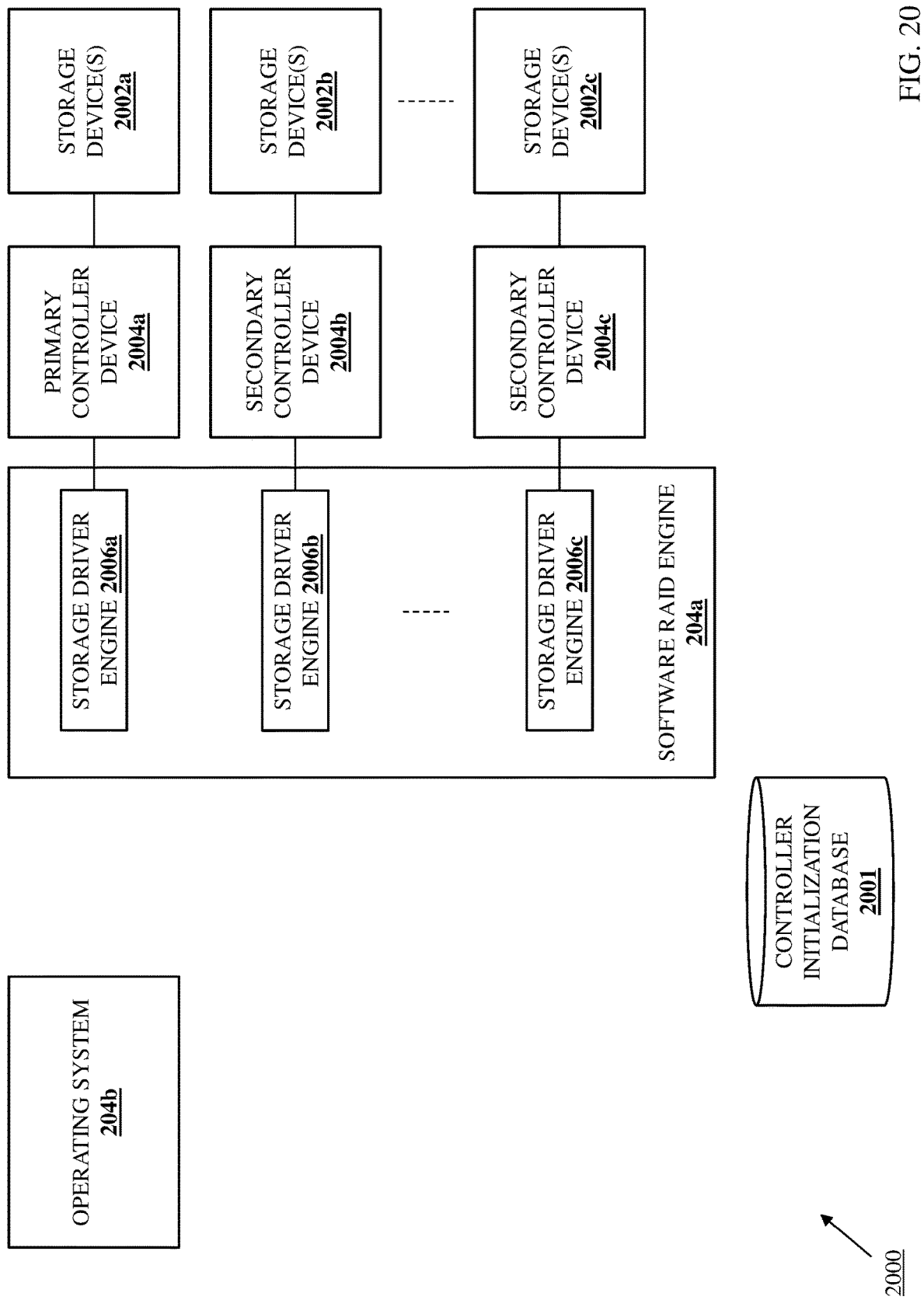
FIG. 20 is a schematic view illustrating an embodiment of the operation of the computing device of FIGS. 2 and 12 during the method of FIG. 19.

The method 1900 begins at block 1902 where a software RAID subsystem provides storage driver subsystems for a primary controller device and secondary controller devices. With reference to FIG. 20, an embodiment of a computing device 2000 that may be provided by the computing device 200 of FIG. 2 and/or the computing device 1200 of FIG. 12 is illustrated for use in the discussions below. As can be seen, computing device 2000 includes the software RAID engine 204a and the operating system 204b discussed above with reference to FIGS. 2 and 12. In addition, the computing device 2000 may include a storage device (not illustrated, but which may be provided by a storage device similar to the storage device 108 discussed above with reference to FIG. 1) that is accessible to the software RAID engine 204a and the operating system 204b (e.g., via a coupling between the storage device and the processing system(s) that provides the software RAID engine 204a and the operating system engine 204b) and that includes a controller initialization database 2001.

Furthermore, the computing device 2000 also includes a plurality of storage devices 2002a, 2002b, and up to 2002c, each of which may be provided by the storage devices 208b and/or 210 discussed above, and one of skill in the art in possession of the present disclosure will appreciate how those storage devices 2002a-2002c may be configured to provide a logical storage device similarly as described above. As illustrated, a primary controller device 2004a is connected to the storage device(s) 2002a and may be provided by any of the controller devices 206, 208a, and 210a; a secondary controller device 2004b is connected to the storage device(s) 2002b and may be provided by any of the controller devices 206, 208a, and 210a; and up to a secondary controller device 2004c is connected to the storage device(s) 2002c and may be provided by any of the controller devices 206, 208a, and 210a, and one of skill in the art in possession of the present disclosure will recognize that the primary controller device 2004a and the secondary controller devices 2004b-2004c may be designated as "primary" and "secondary" according to the teachings of the present disclosure described above. Furthermore, as discussed above, the primary controller device 2004a need not be connected to storage devices while remaining within the scope of the present disclosure as well.

Finally, in the examples below, at least one of the storage devices 2002b and at least one of the storage devices 2002c is configured to provide a boot logical storage subsystem (e.g., a boot LUN) on the logical storage device provided by the storage devices 2002a-2002c. However, while a specific example is provided, one of skill in the art in possession of the present disclosure will appreciate how only a single secondary controller device may be connected to storage device(s) that provide the boot logical storage subsystem on the logical storage device while remaining within the scope of the present disclosure as well.

In an embodiment, at block 1902 and during a runtime mode for the computing device 2000 (i.e., when the operating system 204b controls the computing device 2000), the software RAID engine 204a may provide a respective software driver engine for each of the storage controller devices, with the illustrated embodiment including the software RAID engine 204a providing a software driver engine 2006a for the primary storage controller device 2004a, a software driver engine 2006b for the secondary storage controller device 2004b, and up to a software driver engine 2006c for the secondary storage controller device 2004c. For example, the software RAID engine 204a may provide instructions on a memory system in each of the primary controller device 2004a and the secondary controller devices 2004b-2004c that, when executed by a processing system on each of the primary controller device 2004a and the secondary controller devices 2004b-2004c, cause those processing systems to provide the storage driver engines 2006a and 2006b-2006c, respectively, that are configured to perform the functionality of the storage driver engines, storage driver subsystems, and/or storage drivers discussed below.

As such, while the software driver engines 2006a and 2006b-2006c are illustrated in FIG. 20 as being "included in" the software RAID engine 204a, one of skill in the art in possession of the present disclosure will appreciate how the storage driver engines 2006a and 2006b-2006c may be provided by processing system/memory system combinations in the primary controller device 2004a and the secondary controller devices 2004b-2004c, respectively. In a specific example, the storage driver engines 2006a and 2006b-2006c may be configured to provide respective miniport drivers for each of the primary controller device 2004a and the secondary controller devices 2004b-2004c, respectively, although one of skill in the art in possession of the present disclosure will recognize how other storage driver engines will fall within the scope of the present disclosure as well.

Figure 21:
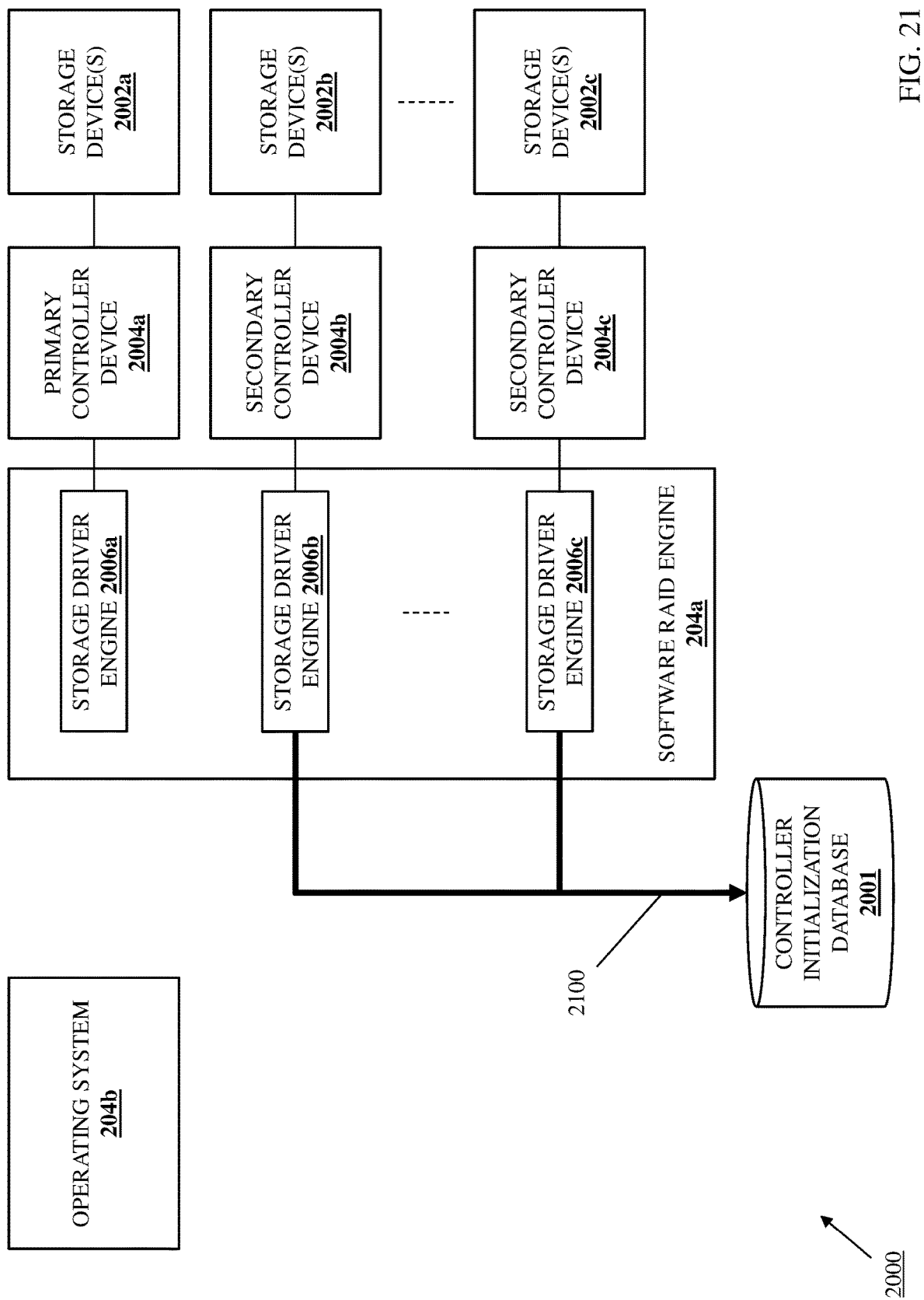
FIG. 21 is a schematic view illustrating an embodiment of the operation of the computing device of FIG. 20 during the method of FIG. 19.

The method 1900 then proceeds to block 1904 where the software RAID subsystem uses the storage device subsystems provided for the secondary controller devices to provide secondary controller initialization information in a controller initialization database. With reference to FIG. 21, in an embodiment of block 1904 and during the runtime mode for the computing device 2000 (i.e., when the operating system 204b controls the computing device 2000), the storage driver engines 2006b-2006c may perform secondary controller initialization information provisioning operations 2100 that include generating secondary controller initialization information for their respective secondary controller devices 2004b-2004c, and transmitting that secondary controller initialization information for storage in the controller initialization database 2001. As will be appreciated by one of skill in the art in possession of the present disclosure, at block 1904 the software RAID engine 204a may identify that the secondary controller devices 2004b-2004c control storage devices 2002b-2002c that store the boot logical storage subsystem (e.g., the boot LUN), and may cause the storage driver engines 2006b-2006c provided for those secondary controller devices 2004b-2004c to provide corresponding secondary controller initialization information in the controller initialization database 2001.

For example, and as discussed below, the direct-attached storage device software RAID hibernation system of the present disclosure may define a "CONFIG_VALUES" structure that is configured to hold any secondary controller initialization information that is necessary to initialize a secondary controller device, a mapped memory address for initializing a secondary controller device, and/or any other secondary controller initialization information that one of skill in the art in possession of the present disclosure would appreciate as allowing for the secondary controller initialization functionality described below. In a specific example, the secondary controller initialization information provisioning operations 2100 at block 1904 of the method 1900 may include each of the storage driver engines 2006b-2006c generating secondary controller initialization information in the respective "CONFIG_VALUES" structure for their respective secondary controller devices 2004b-2004c that may include Base Address Register (BAR) information for that secondary controller device, Bus: Device: Function (BDF) information for that secondary controller device, and/or any of a variety of other information (e.g., Peripheral Component Interconnect express (PCIe) information) that would be apparent to one of skill in the art in possession of the present disclosure.

Furthermore, the secondary controller initialization information provisioning operations 2100 at block 1904 of the method 1900 may include each of the storage driver engines 2006b-2006c updating the "CONFIG_VALUES" structure for their respective secondary controller devices 2004b-2004c in a global "SWRAID_DUMP_CONTEXT" structure that is stored in the controller initialization database 2001 and that may be configured to store an array of the "CONFIG_VALUES" structures, a variable to track a count of the valid entries in the array, and/or any other information that one of skill in the art in possession of the present disclosure would recognize as providing the functionality described below.

In addition, the secondary controller initialization information provisioning operations 2100 at block 1904 of the method 1900 may include each of the storage driver engines 2006b-2006c reserving a memory space in a memory system of the computing device 2000 for use in initializing its respective secondary controller device 2004b-2004c during a hibernation mode for the computing device 2000, and transmitting a memory space identifier (e.g., a pointer) for that memory space for storage in the global "SWRAID_DUMP_CONTEXT" structure in the controller initialization database 2001. As such, following block 1904, the global "SWRAID_DUMP_CONTEXT" structure in the controller initialization database 2001 may store the "CONFIG_VALUES" structure for each of the secondary controller devices 2004b-2004c in association with a memory space identifier for a memory space that will be used to initialize that secondary controller device during a hibernation mode for the computing device 2000. However, while a specific example of the provisioning of secondary controller initialization information has been described, one of skill in the art in possession of the present disclosure will appreciate how a variety of secondary controller initialization information may be provided in a variety of manners while remaining within the scope of the present disclosure as well.

Figure 22:
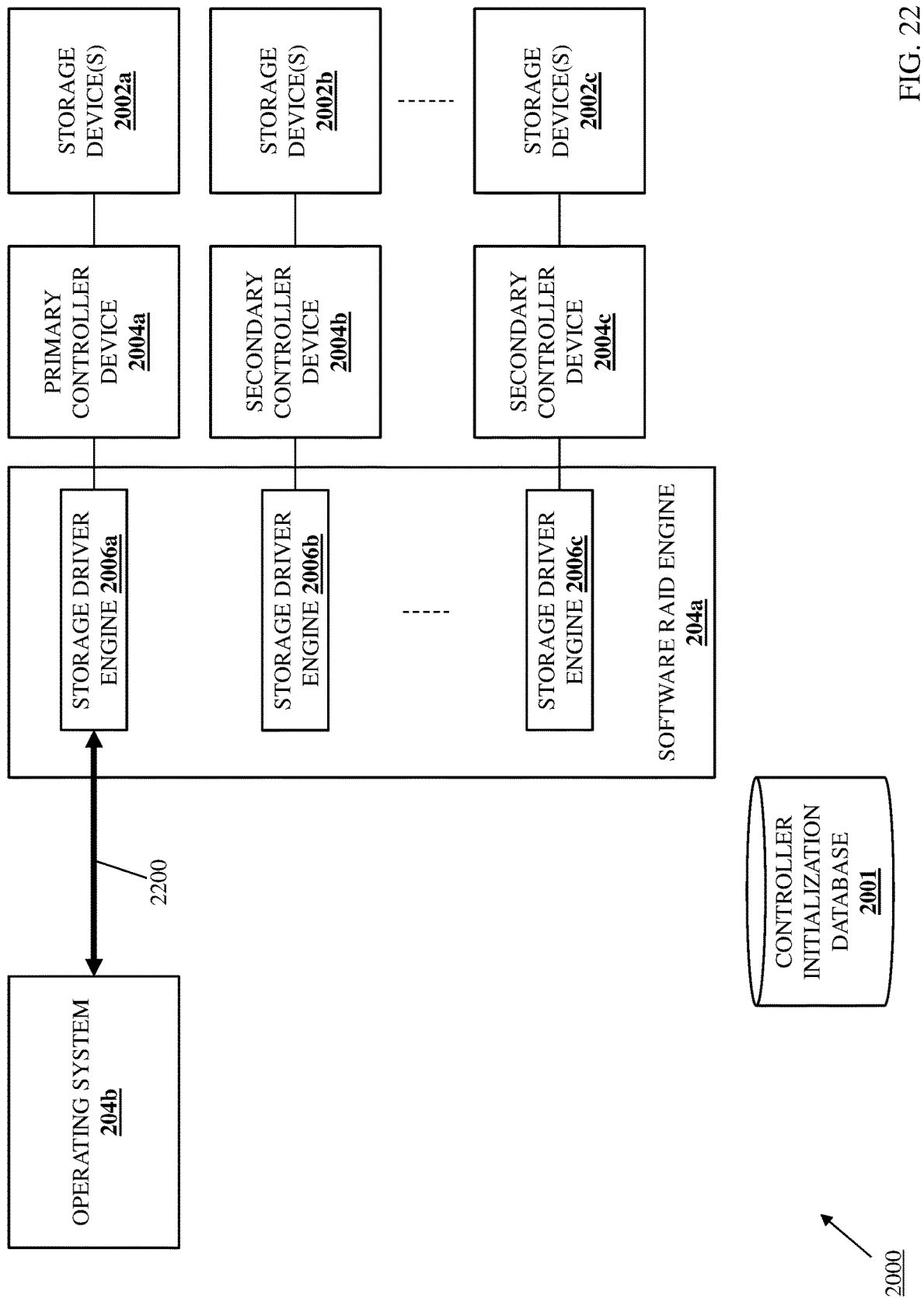
FIG. 22 is a schematic view illustrating an embodiment of the operation of the computing device of FIG. 20 during the method of FIG. 19.

The method 1900 then proceeds to block 1906 where the software RAID subsystem uses the storage driver subsystem provided for the primary controller device to provide a controller initialization database identifier to an operating system. With reference to FIG. 22, in an embodiment of block 1906 and during the runtime mode for the computing device 2000 (i.e., when the operating system 204b controls the computing device 2000), the storage driver engine 2006a provided for the primary controller device 2004a may perform controller initialization database identifier provisioning operations 2200 with the operating system 204b in order to provide a controller initialization database identifier for the controller initialization database 2001 to the operating system 204b.

For example, the controller initialization database identifier provisioning operations 2200 performed by the operating system 204b at block 1906 may include the operating system 204b transmitting a Storage Request Block (SRB)

communication to the storage driver engine 2006a provided for the primary controller device 2004a. In a specific example, the SRB communication transmitted by the operating system 204b to the storage driver engine 2006a at block 1906 may include an "SRB_FUNCTION_DUMP_POINTERS" function code that one of skill in the art in possession of the present disclosure will appreciate begins the configuration of the storage driver engine 2006a to access the controller initialization database 2001 (e.g., the global "SWRAID_DUMP_CONTEXT" structure discussed above) when the computing device 2000 enters the hibernation mode as described below. In response to receiving the SRB communication from the operating system 204b at block 1906, the storage driver engine 2006a may transmit a controller initialization database identifier (e.g., a pointer) for the controller initialization database 2001 to the operating system 204b. To provide a specific example, the controller initialization database identifier may include an address of the global "SWRAID_DUMP_CONTEXT" structure discussed above. However, while a specific example of providing a controller initialization database identifier to an operating system has been described, one of skill in the art in possession of the present disclosure will appreciate how controller initialization information and/or controller initialization databases may be identified to operating systems in a variety of manners that will fall within the scope of the present disclosure as well.

The method 1900 then proceeds to decision block 1908 where the method 1900 proceeds depending on whether the software RAID subsystem has entered a hibernation mode. As discussed above, the operating system 204b (e.g., a WINDOWS® operating system discussed above) may be configured with "hibernation" functionality that allow the WINDOWS® operating system to put the computing device 2000 into a low power state by "unloading" device drivers and putting their associated devices into a low power state. As such, at decision block 1908, the method 1900 will proceed depending on whether or not the computing device 2000 enters the hibernation mode (e.g., in response to an instruction to do so from a user). If, at decision block 1908, the computing device 2000 does not enter the hibernation mode, the method 1900 returns to decision block 1908. Thus, the method 1900 may loop until the computing device 2000 enters the hibernation mode.

Figure 23:
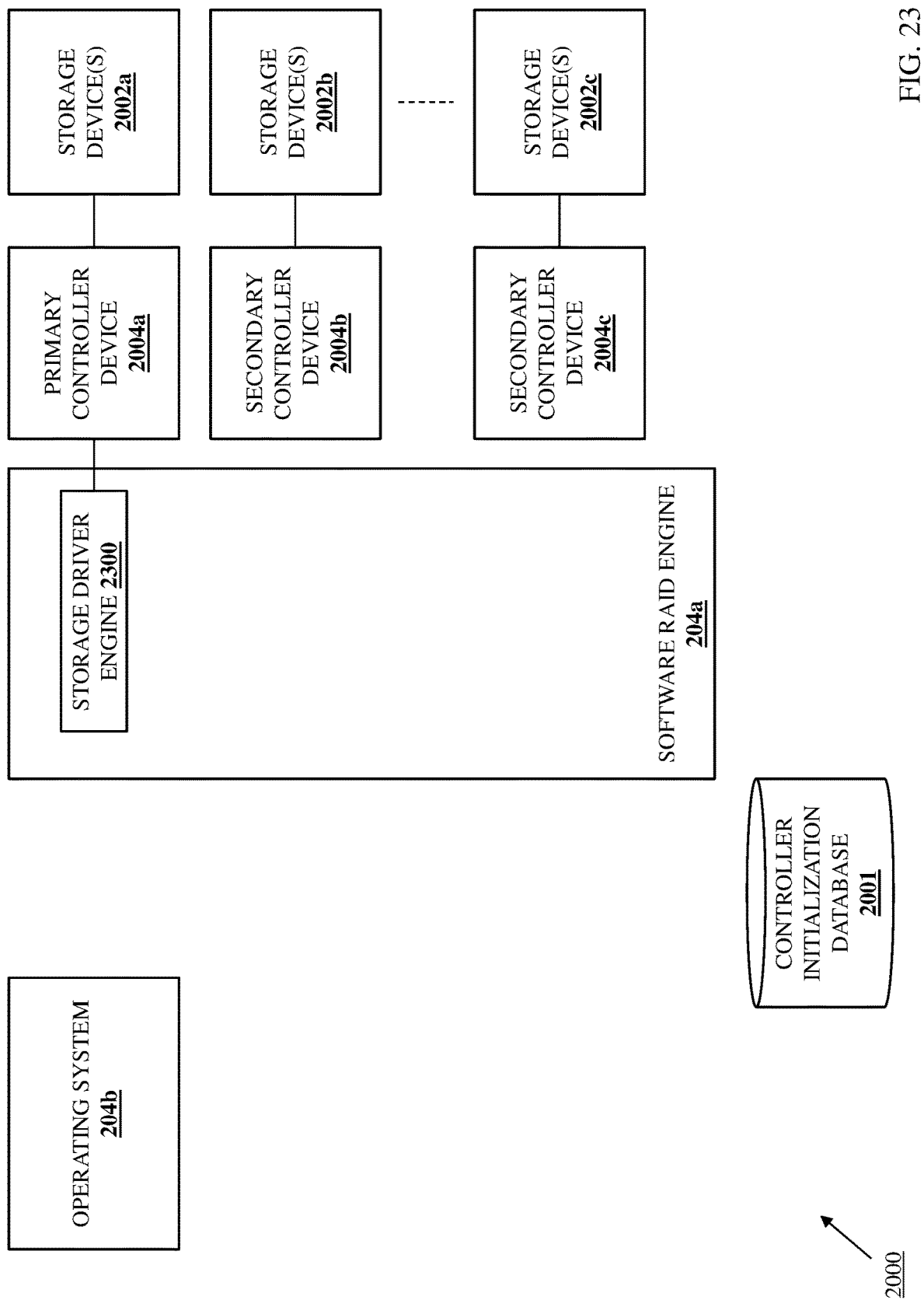
FIG. 23 is a schematic view illustrating an embodiment of the operation of the computing device of FIG. 20 during the method of FIG. 19.

If, at decision block 1908, the computing device 2000 enters the hibernation mode, the method 1900 then proceeds to block 1910 where the operating system loads a storage driver subsystem for the primary controller device. With reference to FIG. 23, in an embodiment of block 1910 and in response to entering the hibernation mode, the operating system 204b may load a storage driver engine 2300 for the primary controller device 2004a, and as illustrated in FIG. 23 and discussed above, the operating system 204b may be configured to not load storage driver engines for any of the secondary controller devices 2004b-2004c. For example, in response to entering the hibernation mode, the operating system 204b may load the software driver engine 2300 that is similar to the storage driver engine 2006a discussed above but that is configured to provide a specialized "boot controller" miniport driver for the primary controller device 2004a, which as discussed above is presented as being connected to the logical storage device provided by the storage devices 2002a-2002c and thus is presented as being connected to the boot logical storage subsystem (e.g., a boot LUN) in that logical storage device.

In addition, one of skill in the art in possession of the present disclosure will appreciate how the operating system 204b (e.g., a reduced functionality version of the operating system 204b relative to its functionality while in the runtime mode) may provide a "Storport" driver (e.g., a special copy of the "Storport" provide called a "storport_dump" driver) for communicating with the "boot controller" miniport driver (e.g., a special copy of the "miniport" driver called a "miniport_dump" driver) that is also loaded by the operating system 204b while in hibernation mode. However, while a specific example of a storage driver subsystem has been described, one of skill in the art in possession of the present disclosure will appreciate how other storage driver engines may fall within the scope of the present disclosure as well.

Figure 24:
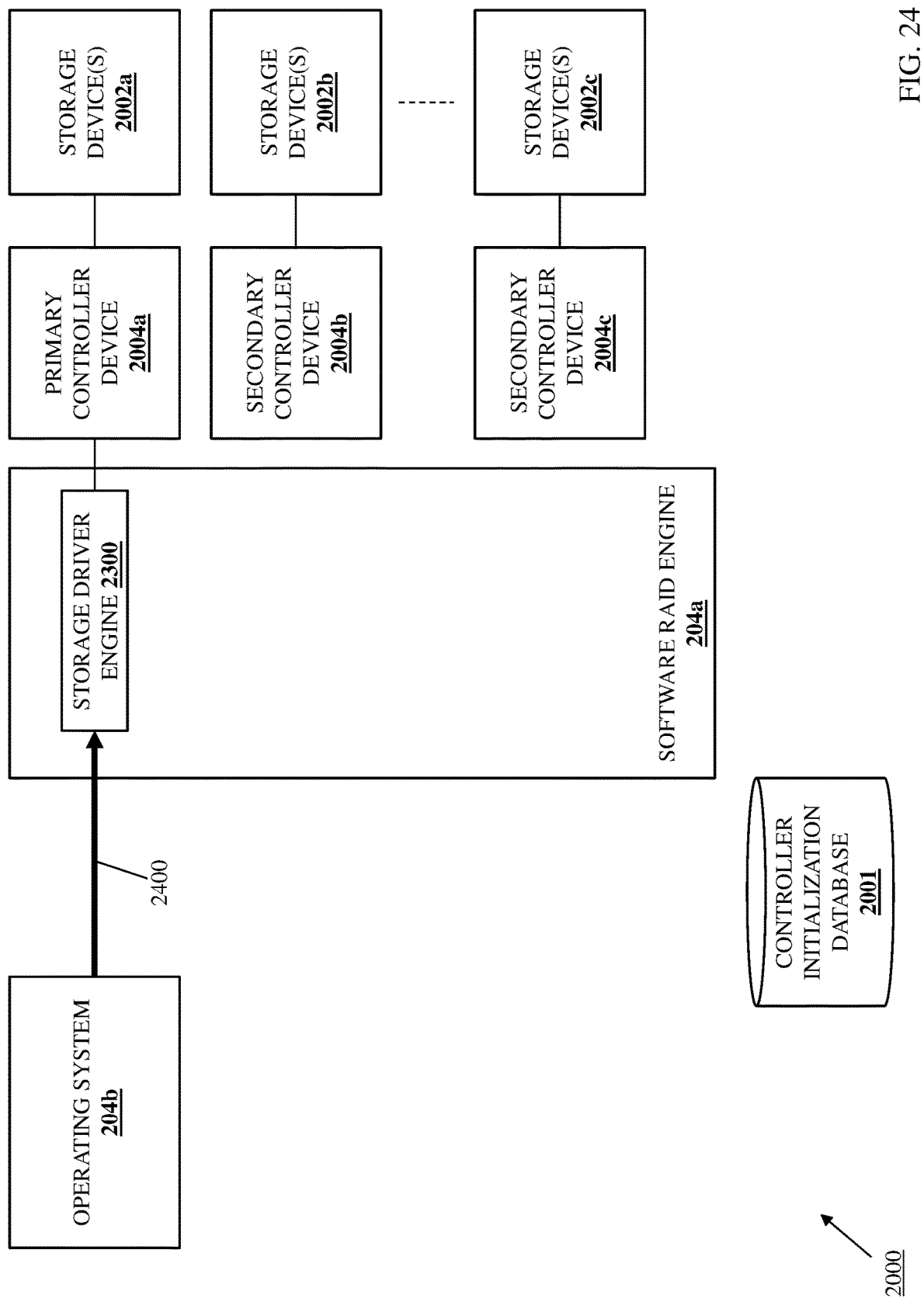
FIG. 24 is a schematic view illustrating an embodiment of the operation of the computing device of FIG. 20 during the method of FIG. 19.

The method 1900 then proceeds to block 1912 where the software RAID subsystem uses the storage driver subsystem provided for the primary controller device to initialize one or more secondary controller device(s) that control physical storage device(s) that provide a boot logical storage subsystem in a logical storage device. With reference to FIG. 24, in an embodiment of block 1912 and during the hibernation mode for the computing device 2000, the operating system 204b may perform controller initialization database identification operations 2400 that may include identifying the controller initialization database 2001 to the storage driver engine 2300 provided for the primary controller device 2004a. For example, while in the hibernation mode, the operating system 204b may call a "HwMiniportinitialize" function for the primary controller device 2004a that is presented to the operating system 204b as providing the boot logical storage subsystem (e.g., the boot LUN) in the logical storage device, with that "HwMiniportinitialize" function operating to initialize the storage driver engine 2300 for the primary controller device 2004a.

In a specific example, the controller initialization database identification operations 2400 at block 1912 may include the operating system 204b providing the controller initialization database identifier (e.g., an address to the global "SWRAID_DUMP_CONTEXT" structure in the controller initialization database 2001) that it received at block 1906 in the "HwMiniportinitialize" function by, for example, specifying that controller initialization database identifier in a "MiniportDumpData" member of a "PORT_CONFIGURATION_INFORMATION" structure in the "HwMiniportinitialize" function. However, while a specific example of the provision of a controller initialization database identifier to a storage driver engine while in a hibernation mode has been described, one of skill in the art in possession of the present disclosure will appreciate how the controller initialization database identifier may be provided to the storage driver engine while in the hibernation mode using other techniques that will fall within the scope of the present disclosure as well.

Figure 25:
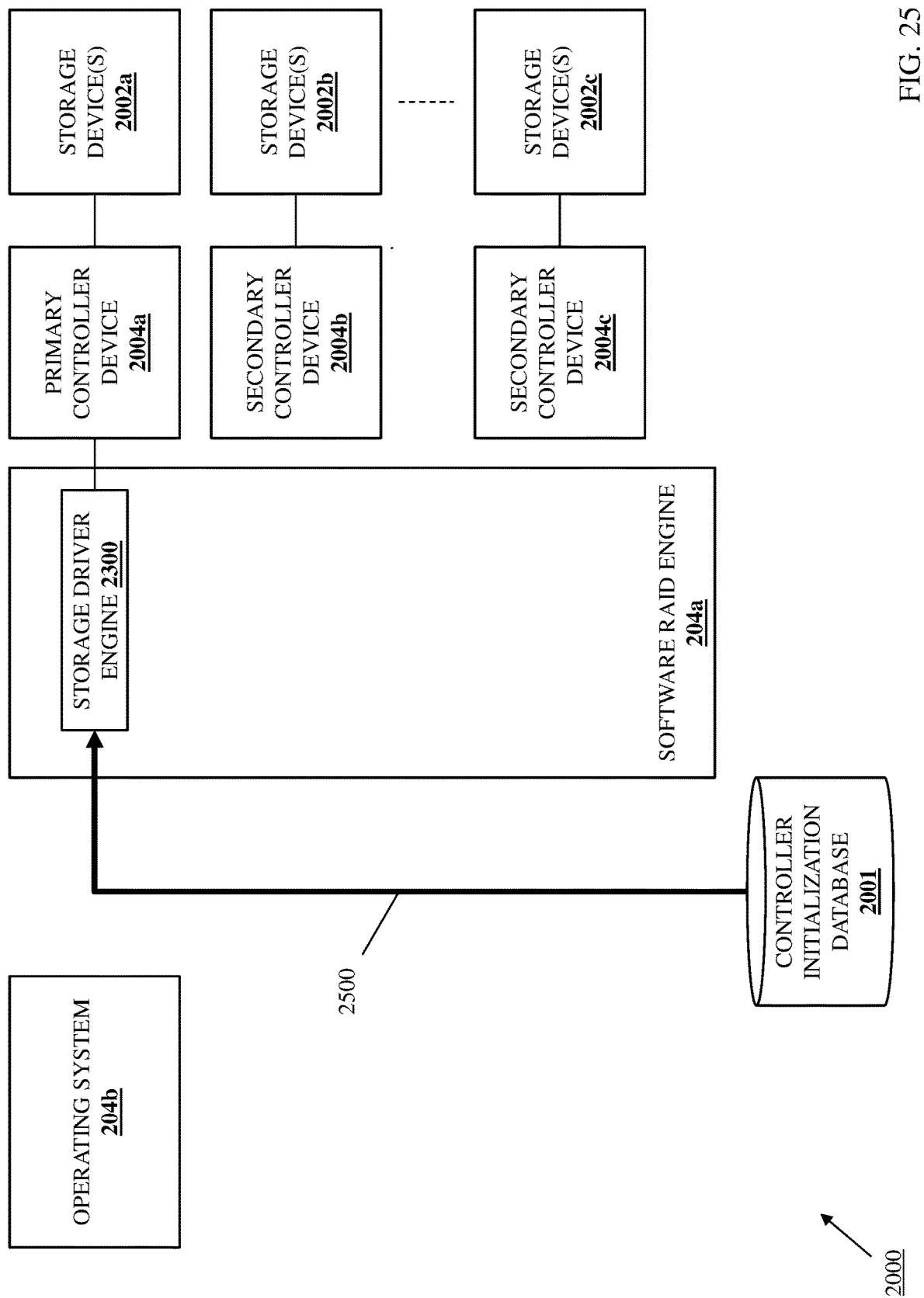
FIG. 25 is a schematic view illustrating an embodiment of the operation of the computing device of FIG. 20 during the method of FIG. 19.

With reference to FIG. 25, in an embodiment of block 1912 and in response to receiving the controller initialization database identifier during the hibernation mode for the computing device 2000, the storage driver engine 2300 may perform controller initialization information retrieval operations 2500 that may include retrieving the secondary controller initialization information that was provided in the controller initialization database 2001 at block 1904. For example, at block 1912, the storage driver engine 2300/primary controller device 2004a may identify the controller initialization database identifier (e.g., an address to the global "SWRAID_DUMP_CONTEXT" structure in the controller initialization database 2001) in the "HwMiniportinitialize" function received from the operating system 204b, and use that controller initialization database identifier to retrieve the secondary controller initialization information from the controller initialization database 2001 (e.g., the "CONFIG_VALUES" structure for each of the secondary controller devices 2004b-2004c, the associated memory space identifiers for the memory spaces that will be used to initialize those secondary controller devices 2004b-2004c, and/or other secondary controller initialization information from the global "SWRAID_DUMP_CONTEXT" structure). However, while a specific example of the retrieval of secondary controller initialization information has been described, one of skill in the art in possession of the present disclosure will appreciate how a variety of secondary controller initialization information may be retrieved using a variety of techniques while remaining within the scope of the present disclosure as well.

Figure 26:
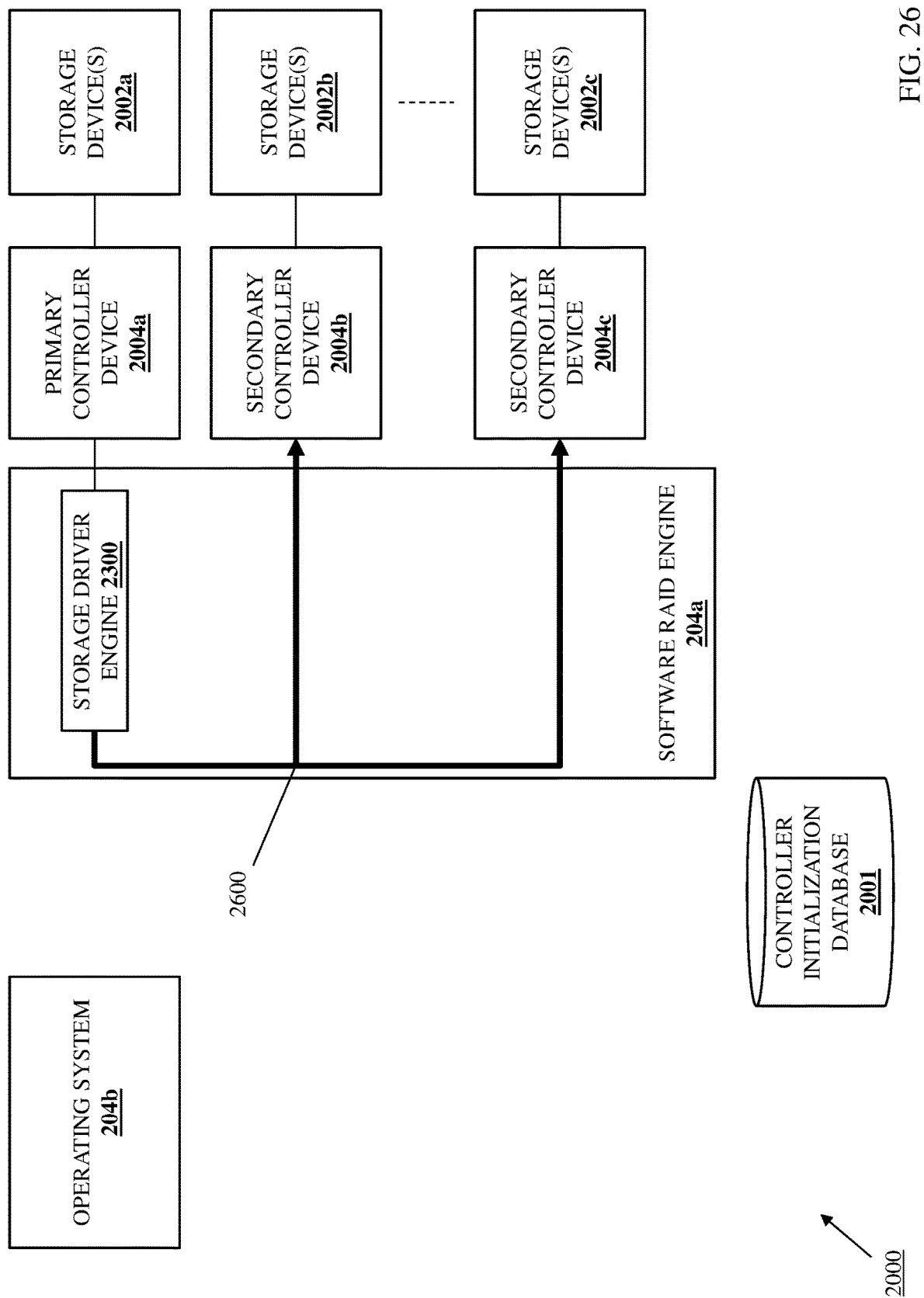
FIG. 26 is a schematic view illustrating an embodiment of the operation of the computing device of FIG. 20 during the method of FIG. 19.

With reference to FIG. 26, in an embodiment of block 1912 and during the hibernation mode for the computing device 2000, the storage driver engine 2300 may perform secondary controller initialization operations 2600 that may include initializing each of the secondary controller devices 2004b-2004c. For example, one of skill in the art in possession of the present disclosure will appreciate how the storage driver engine 2300 may use the BAR information, the BDF information, and/or other information (e.g., PCIe information) in the "CONFIG_VALUES" structure for each of the secondary controller devices 2004b-2004c, along with the respective memory spaces that were reserved for the initialization of those secondary controller devices 2004b-2004c, in order to initialize each of those secondary controller devices 2004b-2004c at block 1912 (e.g., via the programming of registers in those secondary controller device that are identified by the BAR information, as well as any other initialization operations that would be apparent to one of skill in the art in possession of the present disclosure).

The method 1900 then proceeds to block 1914 where the software RAID subsystem performs hibernation operations to generate and store hibernation information in the boot logical storage subsystem. In an embodiment, at block 1914, the operating system 204b may perform any of a variety of hibernation operations that may include generating hibernation information and storing that hibernation information in the boot logical storage subsystem (e.g., the boot LUN) provided by any of the storage devices 2002b-2002c controlled by the secondary controller devices 2004b-2004c, which one of skill in the art in possession of the present disclosure will appreciate is possible while in the hibernation mode due to the initialization of those secondary controller devices 2004b-2004c as described above.

Thus, systems and methods have been described that provide for the initialization of secondary controller device (s) that control storage device(s) that provide a boot logical storage subsystem while in a hibernation mode. For example, the direct-attached storage device software RAID hibernation system of the present disclosure may include a chassis housing a software RAID subsystem coupled to each of a plurality of physical storage devices, each of a plurality of controller devices, and an operating system. While in a runtime mode, the software RAID subsystem presents the operating system with a primary controller device from the plurality of controller devices as being connected to a logical storage device provided by the plurality of physical storage devices. In response to entering a hibernation mode from the runtime mode, the software RAID subsystem provides a storage driver subsystem for the primary controller device and uses it to initialize at least one secondary controller device in the plurality of controller devices that controls at least one of the plurality of physical storage devices that provides a boot logical storage subsystem in the logical storage device. As such, hibernation for operating systems like the WINDOWS® operating system discussed above are enabled in the direct-attached storage device software RAID system of the present disclosure and with virtual drives provided by NVMe storage devices, spanned virtual drives provided by multiple storage devices, and/or in other situations that are not supported by conventional hibernation systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A direct-attached storage device software Redundant Array of Independent Disk (RAID) hibernation system, comprising:
    a chassis;
    a plurality of physical storage devices that are housed in the chassis;
    an operating system that is provided in the chassis;
    a bus driver subsystem that is provided in the chassis;
    a plurality of controller devices that are housed in the chassis and that are each coupled to the operating system, the bus driver subsystem, and at least one of the plurality of physical storage devices;
    a software Redundant Array of Independent Disk (RAID) subsystem that is provided in the chassis, that is coupled to the operating system and the plurality of controller devices, and that is configured to:
        present, to the operating system while in a runtime mode, a primary controller device in the plurality of controller devices as being connected to a logical storage device provided by the plurality of physical storage devices; and
    a filter subsystem that was provided by the software RAID subsystem in a secondary controller device in the plurality of controller devices that controls at least one of the plurality of physical storage devices, wherein the filter subsystem is configured to:
        identify, while in the runtime mode, a controller initialization request from the operating system that requests initialization of the secondary controller device; and
        transmit, to the bus driver subsystem while in the runtime mode and in response to identifying the initialization request, a power-down prevention communication that is configured to prevent the bus driver subsystem from powering down the secondary controller device during a hibernation mode.

2. The system of claim 1, wherein the filter system is configured to:
    process, while in the runtime mode, the controller initialization request to cause the initialization of the secondary controller device.

3. The system of claim 1, wherein the filter subsystem is configured to:
    snoop communications transmitted by the operating system to the secondary controller device to identify the initialization request.

4. The system of claim 1, wherein the power-down prevention communication transmitted by the filter subsystem includes a page file holding communication that notifies the bus driver subsystem that the secondary controller device is holding a page file such that bus driver subsystem will not power down the secondary controller device during the hibernation mode.

5. The system of claim 1, wherein the at least one physical storage device coupled to the secondary controller device provides at least a portion of a boot logical storage subsystem in the logical storage device.

6. The system of claim 1, wherein each of the controller initialization request and the power-down prevention communication are provided in respective Input-output Request Packets (IRPs).

7. The system of claim 1, wherein the operating system is configured to:
provide, in response to entering the hibernation mode from the runtime mode, a storage driver subsystem for the primary controller device, and wherein the software RAID subsystem is configured to:
initialize, using the storage driver subsystem provided for the primary controller device while in the hibernation mode, the secondary controller device.

8. An Information Handling System (IHS), comprising:
a storage controller processing system; and
a storage controller memory system that is coupled to the storage controller processing system and that includes instructions that, when executed by the storage controller processing system, cause the storage controller processing system to provide a filter engine that is configured to:
identify, while in a runtime mode, a controller initialization request from an operating system that requests initialization of a storage controller device that includes the storage controller processing system and the storage controller memory system and that controls at least one of a plurality of physical storage devices that provide a logical storage device; and
transmit, to a bus driver subsystem while in the runtime mode and in response to identifying the initialization request, a power-down prevention communication that is configured to prevent the bus driver subsystem from powering down the storage controller device during a hibernation mode.

9. The IHS of claim 8, wherein the filter engine is configured to:
process, while in the runtime mode, the controller initialization request to cause the initialization of the storage controller device.

10. The IHS of claim 8, wherein the filter engine is configured to:
snoop communications transmitted by the operating system to the storage controller device to identify the initialization request.

11. The IHS of claim 8, wherein the power-down prevention communication transmitted by the filter engine includes a page file holding communication that notifies the bus driver subsystem that the storage controller device is holding a page file such that bus driver subsystem will not power down the storage controller device during the hibernation mode.

12. The IHS of claim 8, wherein the at least one physical storage device coupled to the storage controller device provides at least a portion of a boot logical storage subsystem in the logical storage device.

13. The IHS of claim 8, wherein each of the controller initialization request and the power-down prevention communication are provided in respective Input-output Request Packets (IRPs).

14. A method for providing for hibernation in a software Redundant Array of Independent Disk (RAID) using direct-attached storage devices in a computing device, comprising:
presenting, by a software Redundant Array of Independent Disk (RAID) subsystem to an operating system while in a runtime mode, a primary controller device in a plurality of controller devices as being connected to a logical storage device provided by a plurality of physical storage devices;
identifying, while in a runtime mode by a filter subsystem that was provided by the software RAID subsystem on a secondary controller device that controls at least one of the plurality of physical storage devices, a controller initialization request from the operating system that requests initialization of the secondary controller device; and
transmitting, by the filter subsystem to a bus driver subsystem while in the runtime mode and in response to identifying the initialization request, a power-down prevention communication that is configured to prevent the bus driver subsystem from powering down the secondary controller device during a hibernation mode.

15. The method of claim 14, further comprising:
processing, by the filter subsystem while in the runtime mode, the controller initialization request to cause the initialization of the secondary controller device.

16. The method of claim 15, further comprising:
snooping, by the filter subsystem, communications transmitted by the operating system to the secondary controller device to identify the initialization request.

17. The method of claim 14, wherein the power-down prevention communication transmitted by the filter engine includes a page file holding communication that notifies the bus driver subsystem that the secondary controller device is holding a page file such that bus driver subsystem will not power down the secondary controller device during the hibernation mode.

18. The method of claim 14, wherein the at least one physical storage device coupled to the secondary controller device provides at least a portion of a boot logical storage subsystem in the logical storage device.

19. The method of claim 14, wherein each of the controller initialization request and the power-down prevention communication are provided in respective Input-output Request Packets (IRPs).

20. The method of claim 14, further comprising:
providing, by the operating system in response to entering the hibernation mode from the runtime mode, a storage driver subsystem for the primary controller device; and
initializing, by the software RAID subsystem using the storage driver subsystem provided for the primary controller device while in the hibernation mode, the secondary controller device.

* * * * *